(12) United States Patent
Dietz

(10) Patent No.: US 10,989,098 B2
(45) Date of Patent: Apr. 27, 2021

(54) THERMALLY INSULATED EXHAUST SYSTEM COMPONENTS

(71) Applicant: 3M INNOVATIVE PROPERTIES COMPANY, St. Paul, MN (US)

(72) Inventor: Peter T. Dietz, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/513,833

(22) Filed: Jul. 17, 2019

(65) Prior Publication Data

US 2019/0338691 A1 Nov. 7, 2019

Related U.S. Application Data

(63) Continuation of application No. 14/345,535, filed as application No. PCT/US2012/056543 on Sep. 21, 2012, now Pat. No. 10,450,936.

(Continued)

(51) Int. Cl.
*H01B 7/00* (2006.01)
*H01B 7/02* (2006.01)
(Continued)

(52) U.S. Cl.
CPC ............ *F01N 13/14* (2013.01); *F01N 13/148* (2013.01); *F16L 9/14* (2013.01); *F16L 59/027* (2013.01);
(Continued)

(58) Field of Classification Search
None
See application file for complete search history.

(56) References Cited

U.S. PATENT DOCUMENTS 481,913 A * 8/1892 Noll ...................... F16L 58/182
285/55
3,157,204 A 11/1964 Phillips
(Continued)

FOREIGN PATENT DOCUMENTS

| CN | 85100676 A | 9/1985 |
|---|---|---|
| CN | 1334281 | 2/2002 |

(Continued)

OTHER PUBLICATIONS

Facilitiesnet—What is a Firestop?—Facilitiesnet. Home of Building Operating Management and Facility Maintenance Decisions, p. 1-3. https://www.facilitiesnet.com/firesafety/article/What-is-a-Firestop--10387 (Year: 2009).*

(Continued)

*Primary Examiner* — Jelitza M Perez
(74) *Attorney, Agent, or Firm* — Harold C. Knecht, III

(57) ABSTRACT

A component of an exhaust system for an internal combustion engine. The component comprises an exhaust system structure having an interior through which exhaust gases flow and an exterior, and a thermal insulating wrap for thermally insulating at least a portion of the exterior of the exhaust system structure. The thermal insulating wrap comprises an aqueous mixture comprising an inorganic binder and inorganic filler particles, and a fabric comprising inorganic fibers. The fabric is impregnated with the aqueous mixture so as to form a pliable binder wrap. The pliable binder wrap is wound completely around at least a portion of the exhaust system structure. It can be desirable for the component to further comprise at least one thermal insulator comprising inorganic fibers, where the thermal insulator is disposed between the pliable binder wrap and the exterior of the exhaust system structure.

20 Claims, 4 Drawing Sheets

Related U.S. Application Data

(60) Provisional application No. 61/537,600, filed on Sep. 22, 2011.

(51) Int. Cl.
   *F01N 13/14* (2010.01)
   *F16L 59/02* (2006.01)
   *H01B 3/02* (2006.01)
   *H01B 3/00* (2006.01)
   *F16L 9/14* (2006.01)

(52) U.S. Cl.
   CPC ............. *H01B 3/00* (2013.01); *H01B 3/02* (2013.01); *F01N 2260/20* (2013.01); *F01N 2310/14* (2013.01); *F01N 2450/00* (2013.01); *F01N 2450/08* (2013.01); *F01N 2510/02* (2013.01); *Y10T 29/49231* (2015.01)

(56) References Cited

U.S. PATENT DOCUMENTS

| | | | |
|---|---|---|---|
| 3,415,288 A | 12/1968 | Marshack | |
| 3,458,966 A | 8/1969 | Dunbar | |
| 3,876,384 A | 4/1975 | Santiago | |
| 3,979,246 A | 9/1976 | Ikeda | |
| 4,040,847 A | 8/1977 | Miiler | |
| 4,265,953 A | 5/1981 | Close | |
| 4,282,284 A | 8/1981 | George | |
| 4,385,135 A * | 5/1983 | Langer | B01D 53/86 |
| | | | 106/122 |
| 4,425,397 A | 1/1984 | George | |
| 4,430,384 A | 2/1984 | George | |
| 4,522,771 A * | 6/1985 | McLoughlin | H01B 3/02 |
| | | | 156/89.12 |
| 4,609,578 A | 9/1986 | Reed | |
| 4,863,700 A | 9/1989 | Ten Eyck | |
| 4,950,627 A | 8/1990 | Tokarz | |
| 4,998,597 A | 3/1991 | Bainbridge et al. | |
| 5,404,716 A | 4/1995 | Wells et al. | |
| 5,736,109 A | 4/1998 | Howorth | |
| 5,934,337 A | 8/1999 | Fiala | |
| 5,955,177 A * | 9/1999 | Sanocki | C03C 25/42 |
| | | | 428/210 |
| 6,016,846 A | 1/2000 | Knittel | |
| 6,051,193 A | 4/2000 | Langer | |
| 6,670,291 B1 * | 12/2003 | Tompkins | B32B 27/12 |
| | | | 428/332 |
| 6,758,015 B2 | 7/2004 | Peisert | |
| 8,178,052 B2 | 5/2012 | Dietz | |
| 8,211,373 B2 | 7/2012 | Olson et al. | |
| 8,617,475 B2 | 12/2013 | Dietz et al. | |
| 8,673,229 B2 | 3/2014 | Howorth | |
| 2001/0046456 A1 | 11/2001 | Langer | |
| 2004/0137175 A1 | 7/2004 | Dillon | |
| 2005/0051057 A1 | 3/2005 | Evans | |
| 2005/0115625 A1 | 6/2005 | White | |
| 2010/0209308 A1 | 8/2010 | Kunze | |

FOREIGN PATENT DOCUMENTS

| | | |
|---|---|---|
| DE | 102008036894 | 2/2010 |
| EP | 0724111 | 7/1996 |
| JP | 62038817 | 2/1987 |
| JP | 07097922 | 4/1995 |
| JP | 2002013415 | 1/2002 |
| JP | 2007064469 | 3/2007 |
| JP | 2970348 | 11/2010 |
| WO | 98/35144 | 8/1998 |
| WO | 2005/000466 | 1/2005 |
| WO | 2005/005680 | 1/2005 |
| WO | 2008/086513 | 7/2008 |
| WO | 2008/094354 | 8/2008 |

OTHER PUBLICATIONS

PCT International Search Report for PCT/US2012/056543, dated Feb. 27, 2013.

ThermFlex® 1224 Performance Data, Federal Mogul Systems Protection, 2007.

ThermFlex® 1224 Product Highlights, Federal Mogul Systems Protection, Sep. 1, 2011.

\* cited by examiner

THERMALLY INSULATED EXHAUST SYSTEM COMPONENTS

CROSS REFERENCE TO RELATED APPLICATIONS

This application is a continuation of U.S. application Ser. No. 14/345,535, filed Mar. 18, 2014, now allowed, which is a national stage filing under 35 U.S.C. 371 of PCT/US2012/056543, filed Sep. 21, 2012, which claims priority to U.S. Provisional Application No. 61/537,600, filed Sep. 22, 2011, the disclosures of which are incorporated by reference in their entireties herein.

The present invention relates to a thermal insulation, in particular to thermal insulation that can be suitable for exhaust systems, and more particularly to a thermal insulation wrap that can be suitable for use with an exhaust system component or other structure.

BACKGROUND

Heat shields are known to be used in vehicles (e.g., automobiles) to insulate various parts of a vehicle exhaust system. However, heat shields are relatively expensive to make or purchase and expensive to install or replace when needed.

There is a continuing need for better and more cost effective ways to insulate a vehicle exhaust system (e.g., an automobile exhaust system).

SUMMARY OF THE INVENTION

The present invention can be used in an effort to provide a relatively low cost way to insulate a portion of a vehicle exhaust system (e.g., an automobile exhaust system) from other components (e.g., the vehicle interior) or areas (e.g., passenger compartment) of the vehicle, from areas adjacent (e.g., the ground underneath) the vehicle, from personnel performing maintenance on or being located near the vehicle exhaust system, from users riding the vehicle (e.g., a motorcycle or ATV), or any combination thereof. The present invention may also be used to maintain heat within the exhaust system allowing for the possibility of improved/lower emissions of products of combustion, In one aspect of the present invention, a component of an exhaust system for an internal combustion engine is provided. The component comprises a component structure having an interior through which exhaust gases flow; and a thermal insulating wrap for thermally insulating at least a portion of the component structure. The thermal insulating wrap comprises a fabric impregnated with a mixture of an inorganic binder, inorganic filler particles and water. The fabric comprises inorganic fibers and is impregnated with the mixture so as to form a pliable binder wrap. The pliable binder wrap is wound at least once around at least a portion of the component structure. It can be desirable for the thermal insulating wrap to further comprise at least one thermal insulator comprising inorganic fibers, where the thermal insulator is disposed between the pliable binder wrap and the exhaust system structure.

In another aspect of the present invention, a thermal insulating wrap as described herein is provided separately from the exhaust system component structure.

In a further aspect of the present invention, a kit is provided that comprises a thermal insulating wrap as described herein, where the pliable binder wrap is wound into the form of a roll and disposed into a container that forms a moisture barrier around the roll. If the thermal insulating wrap includes a thermal insulator, it can be desirable for the thermal insulator to be included outside of the container housing the pliable binder wrap. The kit may also include the fabric and mixture, used for making the pliable binder wrap, being kept separated (e.g., with the mixture being in a moisture barrier container) until the time for applying the pliable binder wrap.

In another aspect of the present invention, a method is provided for making a thermal insulating wrap used with an exhaust system component, for an internal combustion engine. The method comprises: forming a mixture comprising mixing water, inorganic binder particles and inorganic filler particles (e.g., by mixing inorganic filler particles with a dispersion of inorganic binder particles); providing a fabric comprising inorganic fibers that can be wound at least once around at least a portion of a component structure of an exhaust system component; and impregnating the fabric with the mixture so as to form a pliable binder wrap. The fabric can be sized (e.g., die cut, laser cut, etc.) or otherwise dimensioned (e.g., manufactured with a desired configuration and desired dimensions) to facilitate the winding or wrapping of the fabric around the desired portion of an exhaust system component. It can be desirable for the method to also include the additional method feature of disposing at least one thermal insulator comprising inorganic fibers on one side of the pliable binder wrap such that, when the pliable binder wrap is wound completely around at least a portion of an exhaust system structure, the at least one thermal insulator is disposed between the pliable binder wrap and the exterior of the exhaust system structure.

In an additional aspect of the present invention, an exhaust system of an internal combustion engine is provided that comprises a component according to the present invention. The present invention can also include an internal combustion engine in combination with the exhaust system.

In another aspect of the present invention, a method is provided for thermally insulating a component of an exhaust system for an internal combustion engine, where the component comprises an exhaust system structure having an interior through which exhaust gases flow and an exterior. The method comprises providing a thermal insulating wrap suitable for thermally insulating at least a portion of the exterior of the exhaust system structure, where the thermal insulating wrap comprises an aqueous mixture comprising an inorganic binder and inorganic filler particles, and a fabric comprising inorganic fibers, with the fabric being impregnated with the aqueous mixture so as to form a pliable binder wrap. The method also comprises wrapping the pliable binder wrap so as to be wound completely around at least a portion of the exhaust system structure, and drying the pliable binder wrap so as to be transformed into a rigid binder wrap wound completely around at least the portion of the exhaust system structure. It can be desirable for the provided thermal insulating wrap to further comprise the feature of at least one thermal insulator comprising inorganic fibers, and for the at least one thermal insulator to be disposed between the pliable binder wrap and the exterior of the exhaust system structure during the wrapping of the pliable binder wrap around the exhaust system structure.

In addition to other potential advantages, the present invention may provide one or any combination of the following advantages: a relatively low-cost approach to insulating all or a portion of an exhaust system of an internal combustion engine, especially relative to the cost of conventional heat shields; a thermal insulation that can be applied directly onto at least a portion of the exterior of an exhaust system structure; a thermal insulation system for an internal combustion engine exhaust system that can reduce an outer surface temperature of an automobile exhaust system structure to below 500° C., below 400° C., below 300° C., below 200° C., or even below 100° C.; a relatively simple method of insulating an exhaust system structure of an exhaust system of an internal combustion engine; elimination of heat shields and the associated heat shield rattle, heat shield tooling and heat shield attachment operations; cost effective way to replace the need for a thermally insulating double walled exhaust or other pipe; protects adjacent surroundings from excessive heat; keeps heat within selected portions of the exhaust system structure; a non-metallic thermal insulation system with a relatively reduced likelihood of corrosion, as compared to conventional heat shield systems; sound attenuation and thermal insulation; useful in repairing defects or damage in an exhaust system structure (e.g., holes in an exterior housing); sufficiently reduce the exterior temperature of a desired portion of an exhaust system structure to eliminate burning exposed skin coming in contact with that portion of the exhaust system structure (e.g., a motorcycle exhaust pipe); enhanced design freedom in configuring and locating the exhaust system structure; and sufficiently reduce the exterior temperature of an underneath portion of an exhaust system structure so as to prevent grass or brush fires caused by contact with the exhaust system structure (e.g., of off-road construction equipment).

These and other aspects, features and/or advantages of the invention are further shown and described in the drawings and detailed description herein, where like reference numerals are used to represent similar parts. It is to be understood, however, that the drawings and description are for illustration purposes only and should not be read in a manner that would unduly limit the scope of this invention.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, the phrase "a thermal insulator" that can be used in the disclosed thermal insulating wraps can be interpreted to mean "one or more" thermal insulators.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF CERTAIN EMBODIMENTS

In describing preferred embodiments of the invention, specific terminology is used for the sake of clarity. The invention, however, is not intended to be limited to the specific terms so selected, and each term so selected includes all technical equivalents that operate similarly.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

In the practice of the present invention, an inventive feature is provided that comprises a thermal insulating wrap for thermally insulating at least a portion of a structure of an exhaust system component. The exhaust system component forms at least part of an exhaust system for an internal combustion engine such as, for example, that used in an aircraft, watercraft, land vehicle (e.g., an automobile, train, etc.), power generator, etc. In some embodiments, the thermal insulating wrap comprises (i) an aqueous mixture comprising an inorganic binder and inorganic filler particles; and (ii) a fabric comprising inorganic fibers. The fabric is impregnated with the aqueous mixture so as to form a pliable binder wrap that is dimensioned to be wound completely or at least mostly around at least a portion of the exhaust system structure (e.g., piping of the exhaust system structure). The pliable binder wrap is intended to be dried so as to be transformed into a rigid binder wrap that will remain in place so as to at least one of, or both, insulate and protect at least a portion of the exhaust system component.

In other embodiments, the thermal insulating wrap comprises (i) the pliable binder wrap in combination with (ii) at least one thermal insulator comprising inorganic fibers, where the thermal insulator(s) is disposed between the pliable binder wrap and an exterior of the exhaust system structure (e.g., a length of an exhaust pipe).

In other embodiments, the thermal insulating wrap comprises (i) the pliable binder wrap in combination with (ii) at least one thermal insulator comprising inorganic fibers, wherein the thermal insulator(s) is disposed between the pliable binder wrap and an exterior of an exhaust system structure (e.g., a length of an exhaust pipe), and (iii) an adhesive layer positioned between the thermal insulator(s) and the exterior of the exhaust system structure (e.g., an exhaust pipe) so as to enhance a bond between the thermal insulator(s) and the exterior.

Figure 1:
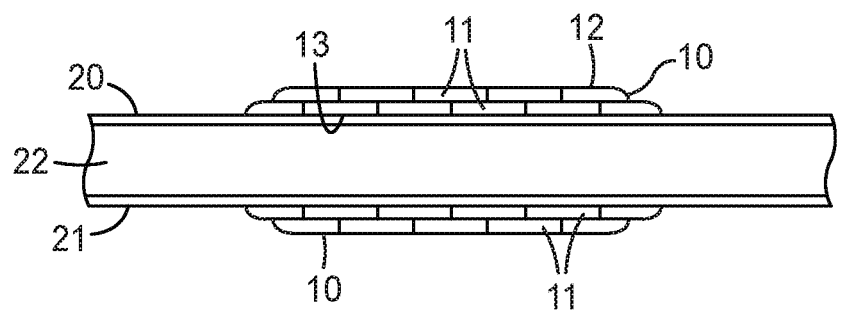
FIG. 1 is a cross sectional view of a length of an exhaust pipe wrapped with one embodiment of a thermal insulating wrap, according to the present invention.

FIG. 1 provides a cross sectional view of a length of an exhaust pipe wrapped with one embodiment of a thermal insulating wrap, according to the present invention. As shown in FIG. 1, a length of exhaust pipe 20 having an inner pipe surface 22 and an outer pipe surface 21 is at least partially overwrapped with exemplary thermal insulating wrap 10 comprising pliable binder wrap 11. As shown in FIG. 1, pliable binder wrap 11 of thermal insulating wrap 10 is capable of being wound completely around at least a portion of the exhaust system structure (e.g., a length of exhaust pipe 20). Exemplary thermal insulating wrap 10 is shown as having a minimum number of two layers of pliable binder wrap 11 in a central portion of the overwrapped region, and possibly a single layer of pliable binder wrap 11 at outer edges of the overwrapped region. However, it should be understood that the overwrapped region may comprise any number of layers of pliable binder wrap 11. In addition, it may be possible for there to be no overwrapped region formed by the wrap 11 (i.e., only one layer of the wrap 11 is used). The pliable binder wrap 11 is intended to be dried so as to be transformed into a rigid binder wrap 11 that will remain in place so as to at least one of, or both, insulate and protect at least a portion of the exhaust system component (e.g., exhaust pipe 20).

Figure 2:
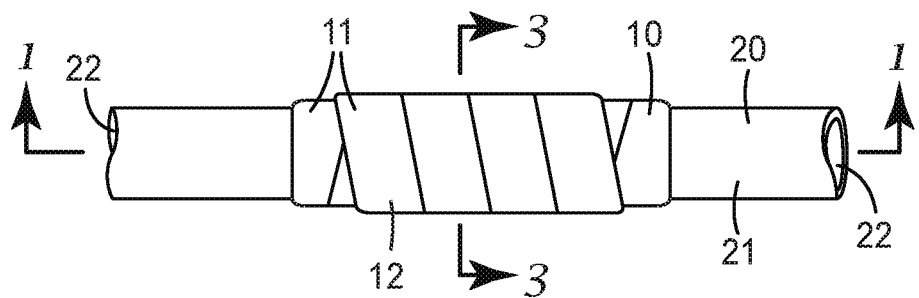
FIG. 2 is a side view of the exhaust system structure of FIG. 1.
Figure 3:
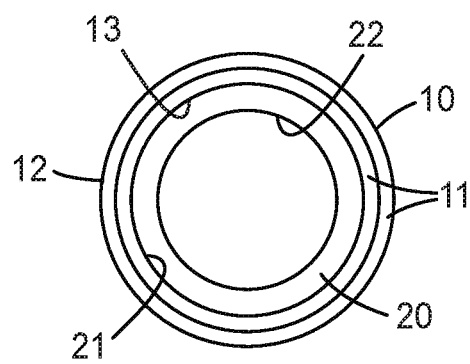
FIG. 3 is a cross sectional view of the exhaust system structure of FIG. 2 taken along line 3-3.

FIG. 2 is a side view of the exhaust system component of FIG. 1. FIG. 3 provides a cross-sectional view of exhaust pipe 20 and exemplary thermal insulating wrap 10 shown in FIG. 2. As shown in FIG. 3, an inner wrap surface 13 of exemplary thermal insulating wrap 10 contacts outer pipe surface 21 of exhaust pipe 20. Further, exemplary thermal insulating wrap 10 provides outer wrap surface 12, which has a surface temperature substantially less than outer pipe surface 21 of exhaust pipe 20 during operation of a vehicle comprising exhaust pipe 20.

Pliable binder wrap 11 of thermal insulating wrap 10 can be in the form of a sheet or a strip that is wrapped or wound around the exterior of an exhaust system structure (e.g., outer pipe surface 21 of a length of exhaust pipe 20). When in the form of a sheet, pliable binder wrap 11 can have a width that is comparable to that of the portion of the exterior of the exhaust system structure to be thermally insulated. That is, when pliable binder wrap 11 is in the form of a sheet, it can be wide enough that all, most or at least a substantial portion of the exterior surface area of the exhaust system structure, which is to be thermally insulated, can be covered with only one winding (i.e., layer) of pliable binder wrap 11 around the exterior of the exhaust system structure. When pliable binder wrap 11 is in the form of a strip, the width of pliable binder wrap 11 is such that pliable binder wrap 11 must be wrapped or wound multiple times around the exterior of the exhaust system structure in order to cover all of the portion of the exterior of the exhaust system structure to be thermally insulated.

Although not limited to any particular dimensions, typically pliable binder wrap 11 has an overall width ranging from about 1.0 centimeters (cm) to about 150 cm (more typically, an overall width ranging from about 5.0 cm to about 20.0 cm), and has an overall length of at least 25.0 cm (more typically, an overall length ranging from about 30.0 cm to about 6.0 meters (m)).

Pliable binder wrap 11 comprises an aqueous mixture comprising an inorganic binder and inorganic filler particles. The inorganic binder can comprise a mixture of water and inorganic binder particles, where the particles are either in suspension, have been dissolved, or some of the particles are in suspension and some have been dissolved. The inorganic binder is preferably a solution of inorganic colloidal particles (e.g., a colloidal solution of silica or alumina particles). The inorganic binder may also be a sodium silicate, potassium silicate, or lithium silicate solution, where the sodium silicate and the potassium silicate are mostly or completely dissolved. Sodium silicate and potassium silicate can be in powder form, which can be dissolved in water to form the solution, and they can be already dissolved in a water solution. It has been discovered that the shelf life and strength of the pliable binder wrap can be improved by using a positively charged colloidal silica, sterically hindered colloidal silica, or de-ionized colloidal silica in the mixture, compared to some of the other more common negatively charged sodium or ammonium stabilized pliable binder wrap material choices.

It is desirable for the inorganic filler particles to be particles of a clay such as, for example only, kaolin clay, bentonite clay, montmorillonite clay, or any combination thereof. The clay filler particles may also be in the form of a calcined clay, delaminated clay, water washed clay, surface treated clay, or any combination thereof. The inorganic filler particles may also be, alternatively or additionally, particles of elemental metal, metal alloy, precipitated silica, fume silica, ground silica, fumed alumina, alumina powder, talc, calcium carbonate, aluminum hydroxide, titanium dioxide, glass bubbles, silicon carbide, glass frit, calcium silicate, or any combination thereof. The inorganic filler particles may be any other fine particulate that completely, mostly or at least substantially retains the inorganic binder in the fabric without forming the mixture into a gel or otherwise coagulating, when mixed with the inorganic binder (especially inorganic colloidal binder particles) in the presence of water, such that the wrap becomes a solid mass that cannot be wound, or is at least very difficult to wind, around the exterior of the exhaust system structure. It can be desirable for the inorganic filler particles to have a maximum size (i.e., major dimension) of up to about 100 microns, 90 microns, 80 microns, 70 microns, 60 microns or, preferably, up to about 50 microns.

In some embodiments, it may be desirable for the aqueous mixture to further comprise dyes, pigment particles, IR reflecting pigment particles, biocides, thickening agents, pH modifiers, PH buffers etc.

The fabric for forming a pliable binder wrap (e.g., pliable binder wrap 11) comprises a fabric comprising inorganic fibers (e.g., continuous glass fibers, silica fibers, basalt fibers, polycrystalline fibers, heat treated refractory ceramic fibers or any combination thereof), suitable for being one or any combination of non-woven, woven, and/or knitted into a fabric. As used herein, a fabric refers to a non-woven fabric, woven fabric, knitted fabric or a combination of these types of fabric. Only non-woven fabrics with sufficient structural integrity are useful in the present invention. For example, it is important that a fabric according to the present invention exhibit sufficient strength (e.g., tensile strength) to survive being wound around the applicable exhaust system structure without tearing apart. A fabric according to the present invention can be made from the same or different types of fibers. As discussed herein, the fabric of the pliable binder wrap is saturated, soaked, coated, sprayed or otherwise impregnated throughout all, most or at least substantial portion of its thickness with the aqueous mixture so as to form a wet and pliable binder wrap (e.g., pliable binder wrap 11). The fabric can be impregnated with the aqueous mixture before or after being applied to the exterior of the exhaust system structure. The pliable binder wrap can then be dried so as to form a rigid binder wrap of a resulting thermal insulating wrap (e.g., thermal insulating wrap 10). As used herein, the term "dried" refers to the pliable binder wrap being heated to a temperature that is hot enough and for a time that is long enough to cause the pliable binder wrap (i.e., the aqueous mixture) to harden and become a rigid binder wrap (i.e., a rigid mixture).

The aqueous mixture used to impregnate the fabric of exemplary thermal insulating wrap 10 is typically a slurry comprising water, an inorganic binder and inorganic filler particles. Although the weight percent of each component within the slurry may vary, typically a given slurry comprises from about 20.0 to about 54.0 percent by weight (pbw) of water, from about 1.0 to about 36.0 pbw of one or more inorganic binders, and from about 10.0 to about 70.0 pbw of inorganic filler particles, based on a total weight of the slurry. More typically, a given slurry comprises from about 22.0 to about 45.0 pbw of water, from about 5.0 to about 30.0 pbw of one or more inorganic binders, and from about 20.0 to about 55.0 pbw of inorganic filler particles, based on a total weight of the slurry.

Although the particle size of the inorganic binder material is not limited, typically, the inorganic binder comprises inorganic binder particles having a maximum particle size of about 200 nm, preferably a maximum particle size of about 100 nm. More typically, the inorganic binder comprises inorganic binder particles having a particle size ranging from about 1.0 to about 100 nm. Even more typically, the inorganic binder comprises inorganic binder particles having a particle size ranging from about 4.0 to about 60 nm.

Further, although the particle size of the inorganic filler particles is not limited, typically, the inorganic filler particles have a maximum particle size of about 100 microns (μm). More typically, the inorganic filler particles have a particle size ranging from about 0.1 μm to about 100 μm. Even more typically, the inorganic filler particles have a particle size ranging from about 0.2 μm to about 50 μm.

Figure 4:
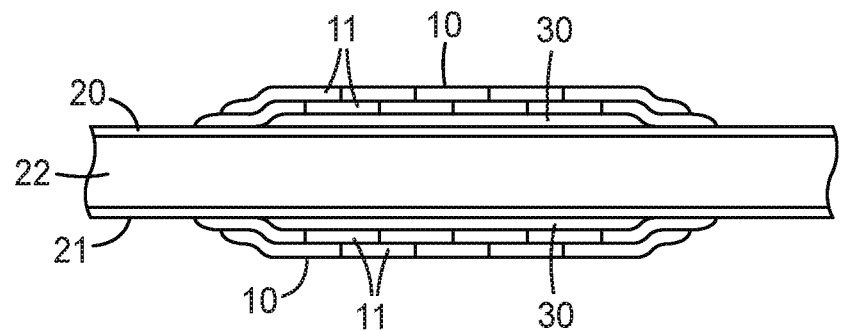
FIG. 4 is a cross sectional view of a length of an exhaust pipe wrapped with another embodiment of a thermal insulating wrap comprising a thermal insulator, according to the present invention.

FIG. 4 is a cross sectional view of a length of an exhaust system structure wrapped with another embodiment of a thermal insulating wrap comprising a thermal insulator according to the present invention. As shown in FIG. 4, a single exemplary thermal insulator 30 is disposed between thermal insulating wrap 10 and exterior surface 21 of the exhaust system structure, namely, exhaust pipe 20.

Figure 5:
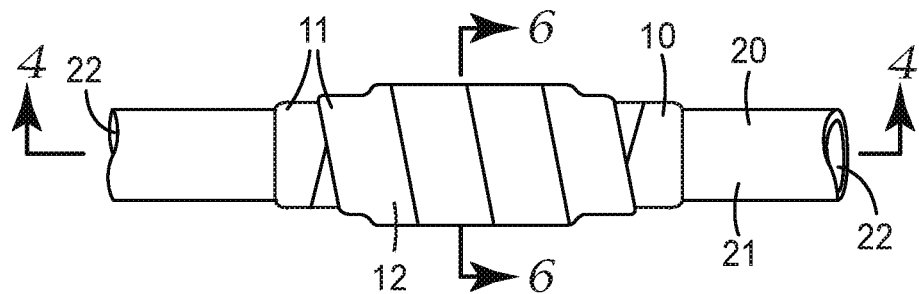
FIG. 5 is a side view of the exhaust system structure of FIG. 4.
Figure 6:
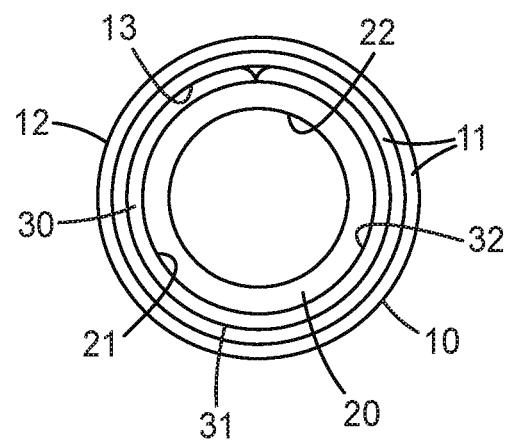
FIG. 6 is a cross sectional view of the exhaust system structure of FIG. 5 taken along line 6-6.

FIG. 5 provides a side view of the exhaust system component of FIG. 4. FIG. 6 provides a cross-sectional view of the exhaust system component of FIG. 5. As shown in FIG. 6, an inner insulator surface 32 of thermal insulator 30 contacts outer pipe surface 21 of exhaust pipe 20, while inner wrap surface 13 of pliable binder wrap 11 contacts outer insulator surface 31 of thermal insulator 30. Further, thermal insulating wrap 10 provides outer wrap surface 12, which has a surface temperature substantially less than outer pipe surface 21 of exhaust pipe 20 during operation of a vehicle comprising exhaust pipe 20.

Figure 7:
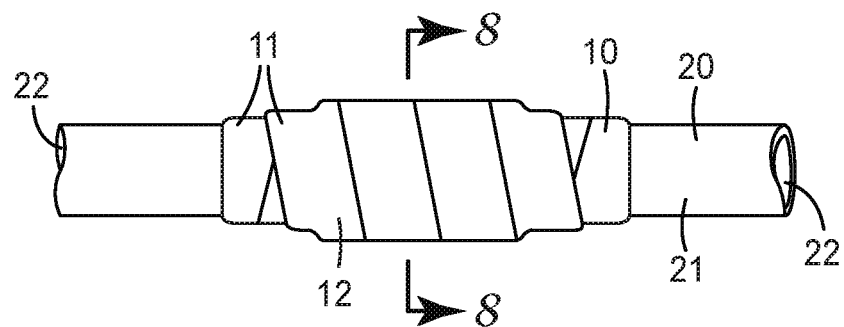
FIG. 7 is a side view of a length of an exhaust pipe wrapped with another embodiment of a thermal insulating wrap comprising separate thermal insulators, according to the present invention.
Figure 8:
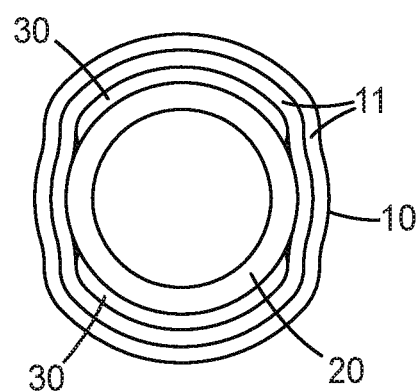
FIG. 8 is a cross sectional view of the exhaust system structure of FIG. 7 taken along line 8-8.

Although exemplary thermal insulator 30 is shown as a single thermal insulator in FIG. 6, it should be understood that one or more thermal insulators 30 may be positioned between outer pipe surface 21 of exhaust pipe 20 and inner wrap surface 13 of exemplary pliable binder wrap 11 as shown in FIGS. 7 and 8.

FIG. 8 provides a cross sectional view of an exhaust system structure wrapped with another embodiment of a thermal insulating wrap comprising two separate thermal insulators according to the present invention. As shown in FIG. 8, separate thermal insulators 30 are positioned on opposite sides of exterior surface 21 of an exemplary exhaust system structure (i.e., a length of exhaust pipe 20). In this embodiment, pliable binder wrap 11 of thermal insulating wrap 10 comes into contact with each thermal insulator 30 as well as exterior surface 21 of pipe 20.

In embodiments using a plurality of separate thermal insulators positioned between the pliable binder wrap (e.g., exemplary pliable binder wrap 11) and the exterior surface of the exhaust system structure (e.g., outer pipe surface 21 of exhaust pipe 20), the thermal insulators may be (i) spaced apart and separated from one another so as to form gaps between adjacent thermal insulators (e.g., as shown in FIG. 8), (ii) positioned adjacent to one another so that there are no gaps between adjacent thermal insulators, and/or (iii) positioned so as to partially or completely overlap one another so as to form multiple layers of thermal insulators between the pliable binder wrap (e.g., exemplary pliable binder wrap 11) and the exterior surface of the exhaust system structure (e.g., outer pipe surface 21 of exhaust pipe 20). In other potential embodiments, more than two thermal insulators 30 can be used that are positioned at various locations on the exterior surface 21 of the particular exhaust system structure, with or without the pliable binder wrap 11 coming in contact with each thermal insulator 30 and the exterior surface 21 of the exhaust system structure.

When one or more thermal insulators are used in a given thermal insulating wrap (e.g., thermal insulating wrap 10), the thermal insulating wrap comprises at least one or a plurality of thermal insulators comprising inorganic fibers. The insulator(s) may be dimensioned so as to insulate all or any desired portion of the exterior of the exhaust system structure (e.g., exterior surface 21 of pipe 20). The thermal insulator also, or alternatively, can function to reduce the likelihood of the rigid fabric wrap (i.e., dried pliable binder wrap 11) cracking or fracturing due to thermal expansion of the exhaust system component. That is, the insulator can absorb the expansion of the exhaust system component.

As shown in FIG. 8, thermal insulators can be generally co-planar with one another, and multiple thermal insulators can be positioned at different locations on the exterior of the exhaust system structure (e.g., exterior surface 21 of pipe 20).

The insulator can be dimensioned so as to be disposed over all, most, or a desired portion of the area of the exterior surface of the exhaust system structure (e.g., exterior surface 21 of pipe 20). Preferably, the pliable binder wrap, in whatever form, is wound so that no portion of the thermal insulator(s) is exposed.

FIG. 7 provides a side view of the exhaust system component of FIG. 8. It can be desirable for the pliable binder wrap to be wound (i.e., with or without one or more thermal insulators 30) so as to form at least 2, 3, 4 or even more layers of the pliable binder wrap (e.g., exemplary pliable binder wrap 11) around the exhaust system structure (e.g., exterior surface 21 of pipe 20). The pliable binder wrap may be dimensioned to only form at least two layers around some or most, but not all, of the exhaust system structure. In other words, the wrap could be only one layer thick in one area due to only partial overlapping of the wrap windings. In one possible embodiment, the pliable binder wrap may be in two or more pieces. For example, one piece of the wrap can be wide enough to cover the desired portion of the exhaust system structure and one or more remaining narrower pieces of the wrap can be wound so as to secure the wider piece in place around the exhaust system structure. It is desirable for there to be enough overlapping of the wrap layers to provide the structural integrity desired for the wound wrap.

Insulators suitable for use in the present invention can be in the form of a woven or nonwoven fibrous web, mat, scrim or strip. The insulator can include one or more layers and comprise any suitable commercially available ceramic fiber insulation. Without intending to be so limited, such insulators may comprise, for example, glass fibers, silica fibers, basalt fibers, refractory ceramic fibers, heat treated refractory ceramic fibers, polycrystalline fibers, high temperature biosoluble inorganic fibers, carbon fibers, or graphite fibers, or aerogel based insulators, etc., or any combination thereof, as desired. Intumescent materials (e.g., vermiculite, graphite, etc.) may also be included to provide compression, if needed to prevent movement.

The thermal insulator may comprise intumescent materials and non-intumescent materials. The thermal insulator may be intumescent or non-intumescent. The thermal insulator may also comprise or be used with materials suitable for functioning as a fire stop. For example, a relatively thinner single or multiple layer fire stop material could form a laminate with a relatively thicker single or multiple layer non-intumescent thermal insulator, where the thermal insulator is sufficiently compliant and thick enough to accommodate heat induced expansion of the fire stop material (e.g., an intumescent material) with heat. With this embodiment, the thermal insulator would be compliant (i.e., compressible) enough to allow for the expansion of the fire stop material. In such a compressed state, the insulating properties of the thermal insulator would likely be as good as they would be when the thermal insulator is in its uncompressed condition.

It is the temperature that the pliable binder wrap is exposed to, rather than the temperature of the system component structure, that will determine the choice of materials used for the pliable binder wrap (e.g., the fabric, inorganic binders and inorganic filler particles). For example, if the system component structure (e.g., an exhaust system component structure) exhibited an exterior surface temperature of 1000° C., the materials used for the pliable binder wrap may not need to survive such an elevated temperature, if a thermal insulator is used that effectively insulates the pliable binder wrap materials from the elevated temperature of the system component structure. In fact, by employing one or more such thermal insulators, it may be possible to use organic materials (e.g., any combination of organic fibers, an organic fiber fabric, organic binder, and organic filler particles) to make part or all of the pliable binder wrap. It may also be desirable to use such organic materials to make part of the pliable binder wrap, even without using such a thermal insulator. By comprising an appropriate fibrous material, the thermal insulator may also exhibit acoustical properties or achieve other acoustical benefits.

In other embodiments of the present invention, an optional adhesive layer (not shown) may be used to enhance the bond between (i) a given pliable binder wrap (e.g., exemplary pliable binder wrap 11) and/or a given thermal insulator (e.g., exemplary thermal insulator 30) and (ii) an exterior surface of the exhaust system structure (e.g., outer pipe surface 21 of exhaust pipe 20).

High-temperature adhesive may comprise a heat-resistant, dryable adhesive comprising a mixture of colloidal silica and clay, or a mixture of sodium or potassium silicate and clay. The adhesive may also contain delaminated vermiculite, fumed silica, fumed alumina, titanium dioxide, talc, or other finely ground metal oxide powders. The adhesive may further comprise one or more organic binders. Suitable organic binders include, but are not limited to, ethylene vinyl acetate (EVA), acrylic, urethane, silicone elastomers and/or silicone resins. One or more organic binders may be added to improve green strength or enhance water resistance of the adhesive. The dryable adhesive may also contain IR reflective pigments, glass or ceramic bubbles or micro-porous materials such as aerogels.

High-temperature adhesive may be applied directly onto outer pipe surface 21 of exhaust pipe 20 or a thermal insulator (e.g., exemplary thermal insulator 30), which is subsequently applied over outer pipe surface 21 of exhaust pipe 20.

The present invention is further directed to kits comprising one or more of the elements mentioned herein. In some embodiments, for example, the kit comprises one or more of the following elements: (i) one or more pliable binder wraps (e.g., one or more pliable binder wraps 11), desirably, wound into the form of a roll and stored within a moisture barrier container; (ii) one or more thermal insulators; (iii) one or more units/sheets of adhesive either separate from or attached to an outer surface of element (i) and/or element (ii); and (iv) a cutting device (e.g., a razor or scissors). In an alternative kit embodiment, the mixture and the fabric used in making the pliable binder wrap are kept separated and combined later (e.g., before or after the fabric is applied to the component structure.

Figure 9:
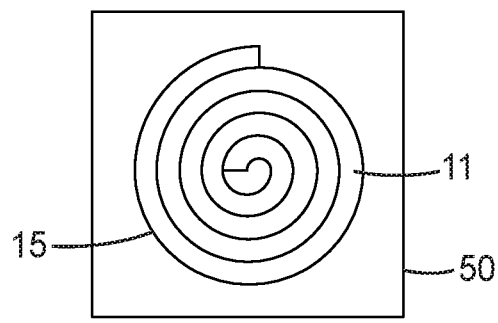
FIG. 9 is a side view of a roll of a thermal insulating wrap positioned within a container.

FIG. 9 provides a side view of a possible kit component, namely, a roll 15 of pliable binder wrap 11 positioned within a container 50 (e.g., a moisture barrier plastic bag), wherein roll 15 is readily unwound. Desirably, container 50 prevents moisture from entering or leaving an inner storage compartment of container 50 ((e.g., a metalized plastic foil bag for increased shelf life) so that roll 15 of pliable binder wrap 11 remains pliable (i.e., does not dry out) prior to use. Further, container 50 is desirably resealable so that any unused portion of roll 15 of pliable binder wrap 11 can be restored after a given application.

Figure 10:
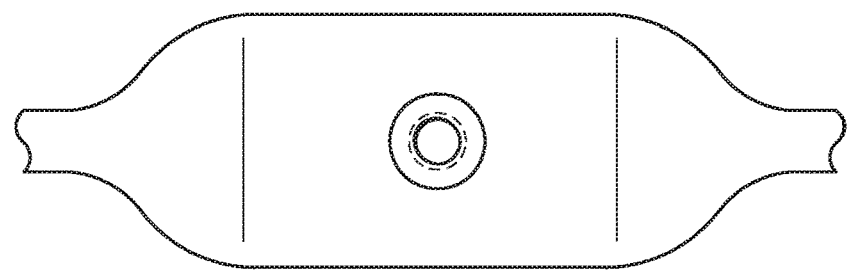
FIG. 10 is a side view of a catalytic converter with an open sensor port.
Figure 11:
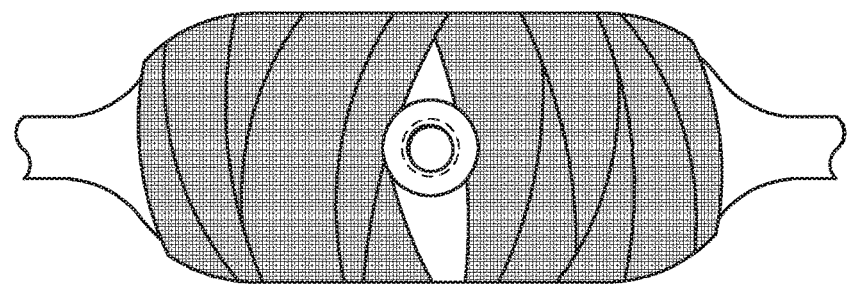
FIG. 11 is a side view of the exhaust system structure of FIG. 10 wrapped with one embodiment of a thermal insulating wrap, according to the present invention, with un-insulated areas adjacent the sensor port.

Other exemplary exhaust system components that can benefit from the present invention can include, for example, pollution control devices (e.g., diesel particulate filters or traps, catalytic converters, etc.), mufflers, expansion chambers, and resonators. Referring to FIG. 10, a conventional catalytic converter 60 is shown with a main housing 61 that is connected at either end to an exhaust pipe 20 by a cone-shaped housing or end-cone 62 and can be wrapped as shown in FIGS. 2 and 5. It may be more difficult to fully wrap some exhaust system components that include, e.g., an additional structural feature (e.g., a port, bracket, flange, etc.) that extends outwardly from or otherwise off of its exterior surface. An example of such an exhaust system component is the catalytic converter 60 with an oxygen sensor port 64 (shown without its sensor in place). When the catalytic converter 60 is wrapped with only a pliable binder wrap 63, according to the present invention, it may be difficult to insure that the exterior surface of the catalytic converter 60, intended to be insulated, will be completely covered with the wrap 63. As shown in FIG. 11, for example, triangular-shaped open areas 66 of the wrap 63 may be formed resulting in corresponding areas of the exterior surface of the catalytic converter 60, on opposite sides of the sensor port 64, to exposed and, therefore, un-insulated.

Figure 12:
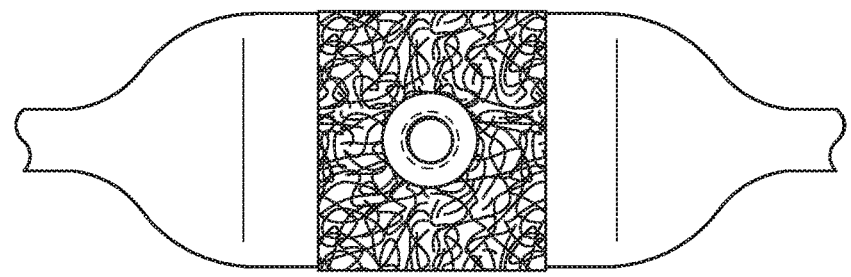
FIG. 12 is a side view of the exhaust system structure of FIG. 10 with a separate inorganic fibrous mat or patch disposed around the sensor port.
Figure 13:
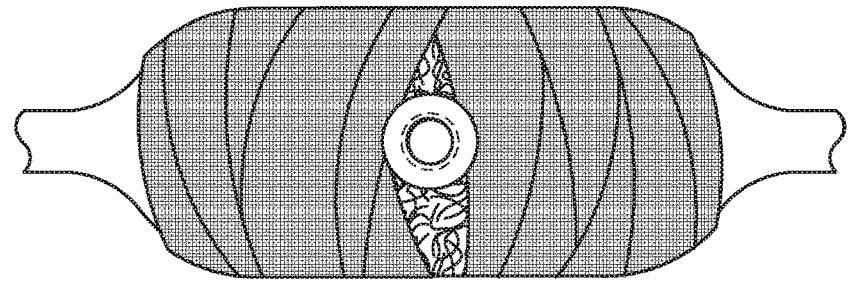
FIG. 13 is a side view of the exhaust system structure of FIG. 12 wrapped with one embodiment of a thermal insulating wrap, according to the present invention, with the un-insulated areas of FIG. 11 being covered by the separate thermal insulator.

To address this problem, a separate piece of an inorganic fibrous mat or other structure 68 can be disposed around the port 64, for example, by forming an opening (e.g., a slit or hole) through the mat 68 that is configured to receive the port 64 therethrough. In this way, the mat 68 can be positioned around the port 64 and against the exterior surface of the catalytic converter main housing 61, e.g., in the manner shown in FIG. 12. Although exemplary mat 68 is shown as a single piece in FIG. 12, it should be understood that one or more such mats 68 may be positioned between the catalytic converter housing 61 and the exemplary pliable binder wrap 63. Each mat 68 can be a piece of almost any fibrous sheet- or mat-like structure. For example, each mat 68 can be a piece of fabric like that used to make a pliable binder wrap 63 or a piece of a nonwoven fibrous web, mat, scrim or strip like that used to make a thermal insulator 30. After the mat 68 is in place, the catalytic converter 60 can be wrapped with the pliable binder wrap 63. This time, as shown in FIG. 13, if open areas 66 of the wrap 63 are formed, the corresponding areas of the exterior surface of the catalytic converter 60 will still be covered, and therefore insulated, by the mat 68 (Compare FIGS. 11 and 13).

It is desirable for the fibrous mat 68 to be impregnated with an aqueous mixture, like that used to make the pliable binder wrap 63, so as to form a pliable binder mat 68 with properties, when dried, that are similar or identical to the pliable binder wrap 63, when it is dried (i.e., the rigid binder wrap 63). Thus, when the pliable binder mat 68 is in a dried state, it transforms into a rigid binder mat 68, and the exposed portions of the rigid binder mat 68 (e.g., in open areas 66) will exhibit properties at least similar to, or identical to, those of the rigid binder wrap 63. As used herein, the term "dried" also refers to the pliable binder mat being heated to a temperature that is hot enough and for a time that is long enough to cause the pliable binder mat (i.e., the aqueous mixture) to harden and become a rigid binder mat (i.e., a rigid mixture).

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

Test Methods

Crush Strength Test

The following is a description of the process used to test the crush strength of a rigid binder wrap according to the present invention.

All samples were produced using four foot lengths of two inch wide fiberglass knit tape, like that described in the Example of U.S. Pat. No. 4,609,578, which patent is incorporated herein by reference in its entirety. The sample pliable binder wraps were made by dipping the fabric tape into each specified slurry mixture followed by hand massaging the slurry into the fabric to evenly saturate the slurry into the fabric.

At room temperature, each sample of the four foot length two inch wide pliable binder wrap was wrapped around a 2" diameter cylindrical aluminum mandrel (i.e., with a 2 mil polyester film wrapped around the mandrel to make removal easier) using one kg of winding force to form hollow cylinders two inches long with a two inch inside diameter, an average outside diameter of from about 2.2 to 2.4 inch, and an average wall thickness of about 0.1 to 0.2 inch. Each sample of the resulting pliable hollow cylinders was dried at 90° C. for at least one hour while still on the mandrel. After being dried, each of the resulting hard cylinders was removed from the mandrel. Some of the hard cylinders were cooled then placed in a MTS force measurement device to evaluate their individual crush strength. The force measurement device compresses the cylinder at a rate of one inch per minute while recording resultant force. The peak force is recorded. Each sample was positioned in the force measurement device with the opening of the test cylinder lying horizontal. Other samples of the hard cylinders subjected to additional conditioning being tested for crush strength. In particular, some of the hard cylinder samples were heated to 500° C. for 18 hours, allowed to cool to room temperature, and then tested for crush strength. Other hard cylinder samples were heated to 500° C. for 18 hours, allowed to cool to room temperature, soaked in water for 18 hrs, and then tested for crush strength.

EXAMPLES

The following materials as shown in Table 1 were used in the examples below:

TABLE 1

Materials

| | Description | Source |
|---|---|---|
| Fabrics | | |
| ECG heat set knit | 2" 3" or 4" wide SCOTCHCAST ™ knit heat treated G yarn | 3M, St. Paul MN |

TABLE 1-continued

Materials

| | Description | Source |
|---|---|---|
| ECG non-heat set knit | 3" wide SCOTCHCAST ™ knit not heat treated G yarn | 3M, St. Paul MN |
| ECDE heat set knit | 4" wide SCOTCHCAST ™ knit heat treated DE yarn | 3M, St. Paul MN |
| silica weave | TECSIL ® 3" 13-621 | Intec, Anaheim CA |
| e-glass weave | #8817K68 | McMaster-Carr, Chicago IL |
| Inorganic Binder | | |
| colloidal silica 4 nm | NALCO ™ 1115 | Nalco, Chicago IL |
| colloidal silica 15 nm | NALCO ™ 1144 | Nalco, Chicago IL |
| colloidal silica 20 nm | NALCO ™ 2327 | Nalco, Chicago IL |
| colloidal silica 60 nm | NALCO ™ 1060 | Nalco, Chicago IL |
| colloidal alumina 50 nm | NYACOL ® AL20 | Nyacol, Ashland MA |
| colloidal silica 8 nm | LUDOX ® SM | Grace Davidson Columbia MD |
| Colloidal silica positively charged | Ludox CL-P | Grace Davidson Columbia MD |
| Colloidal silica deionized | Ludox TMA | Grace Davidson Columbia MD |
| Colloidal silica 20 nm positive charge | NALCO 1056 | Nalco, Chicago, IL |
| Colloidal silica sterically stabilized | Bindzil cc401 | AkzoNobel, Marietta, GA |
| Colloidal silica positive charge wide particle size range | Bindzil CAT80 | AkzoNobel, Marietta, GA |
| Colloidal silica neutral pH | Bindzil DP5100 | AkzoNobel, Marietta, GA |
| sodium silicate | STIXO ™ NN | PQ Corporation, Valley Forge PA |
| Inorganic Fillers and Additives | | |
| kaolin clay | POLYPLATE ™ P | KaMin, Macon GA |
| calcined kaolin | 2000C | KaMin, Macon GA |
| bentonite clay | BENTOLITE ® | Southern Clay Gonzales TX |
| aluminum hydroxide 1 | Huber ONYX ELITE ® | Huber, Norcross GA |
| aluminum hydroxide 2 | MARTINAL ® OL-104 LE | Albemarle, Baton Rouge LA |
| fumed silica | CAB-O-SIL ® M-5 | Cabot, Boston MA |
| fumed alumina | SpectrAl ® grade 51 | Cabot, Boston MA |
| alumina powder | Type A | Fisher Scientific, Fairlawn NJ |
| precipitated silica | ZEOTHIX ® 265 | Huber, Norcross, GA |
| ground silica 1 | MIN-U-SIL ™ 10 | U.S. Silica, Frederick MD |
| ground silica 2 | MIN-U-SIL ™ 30 | U.S. Silica, Frederick MD |
| aluminum powder | 325 mesh #11067 | Alfa/Aesar, Ward Hill MA |
| talc | talc powder | J. T. Baker, Phillipsburg NJ |
| aluminum silicate | #14231 | Alfa/Aesar, Ward Hill MA |
| calcium silicate | MICRO-CEL ® | Celiter Corp., Lompoc CA |
| calcium carbonate | | Sigma Aldrich, St. Louis MO |
| silicon carbide | 800W | Electro Abrasives, Buffalo NY |
| glass bubbles | SCOTCHLITE ™ K37 | 3M, St. Paul MN |
| glass frit | EG02934VEG | Ferro, Cleveland OH |
| titanium dioxide | R900 | Dupont, Wilmington DE |
| sodium hydroxide | Pellets | EMD, Germany |
| nitric acid | 69% Nitric acid | J. T. Baker, Phillipsburg NJ |
| Kaolin clay | Dixie clay | R. T. Vanderbuilt, Norwalk, CT |
| Wollastonite | Vansil 50 | R. T. Vanderbuilt, Norwalk, CT |
| Manganese Ferrite | FM-2400 | Rockwood, Beltsville, MD |
| Silane | Z-6040 | Dow-Corning, Midland MI |

Example 1

Embodiments of the invention were produced by the method generally described herein.

Slurries were prepared using ingredients shown above. In each slurry, inorganic materials were added to liquid component(s) using a high shear mixer and blended until smooth to form a given slurry as shown in Table 2 below.

TABLE 2

| Slurry | Composition |
|---|---|
| 1 | 50 wt % 2327 colloidal silica, 50 wt % POLYPLATE ™ P |
| 2 | 67 wt % 2327 colloidal silica, 33 wt % calcium carbonate |
| 3 | 57.1 wt % 1144 colloidal silica, 42.9 wt % calcium carbonate |
| 4 | 94.4 wt % 2327 colloidal silica, 5.6 wt % M-5 fumed silica |
| 5 | 87.8 wt % 1144 colloidal silica, 12.2 wt % M-5 fumed silica |
| 6 | 60 wt % 2327 colloidal silica, 40 wt % talc |
| 7 | 52.9 wt % 1144 colloidal silica, 47.1 wt % talc |
| 8 | 60 wt % 2327 colloidal silica, 40 wt % silicon carbide |
| 9 | 50 wt % 2327 colloidal silica, 40 wt % aluminum powder, 10 wt % POLYPLATE ™ P |
| 10 | 82.3 wt % 2327 colloidal silica, 17.7 wt % bentonite clay |
| 11 | 84 wt % 2327 colloidal silica, 16 wt % fumed alumina |
| 12 | 84.4 wt % 2327 colloidal silica, 15.6 wt % glass bubbles |
| 13 | 50 wt % 2327 colloidal silica, 50 wt % titanium dioxide |
| 14 | 66.7 wt % 2327 colloidal silica, 33.3 wt % alumina powder |
| 15 | 84.2 wt % 2327 colloidal silica, 15.8 wt % precipitated silica |
| 16 | 50 wt % 2327 colloidal silica, 50 wt % aluminum silicate |
| 17 | 42.1 wt % 2327 colloidal silica, 57.9 wt % aluminum hydroxide-1 |
| 18 | 42.1 wt % 2326 colloidal silica, 57.9 wt % ground silica 1 |
| 19 | 42.1 wt % 2327 colloidal silica, 57.9 wt % ground silica 2 |
| 20 | 45.3 wt % 2327 colloidal silica, 50.0 wt % silica 1, 2.8 wt % silicon carbide, 1.8 wt % bentonite clay |
| 21 | 60 wt % 2327 colloidal silica, 40 wt % POLYPLATE ™ P |
| 22 | 60 wt % 2327 colloidal silica, 40 wt % 2000C calcined clay |
| 23 | 44.5 wt % colloidal silica 1144, 33.3 wt % glass frit, 22.2 wt % 2000C |
| 24 | 60 wt % SM colloidal silica, 40 wt % POLYPLATE ™ P |
| 25 | 50 wt % 2327 colloidal silica, 50 wt % POLYPLATE ™ P |
| 26 | 50 wt % 4 nm colloidal silica, 50 wt % POLYPLATE ™ P |
| 27 | 50 wt % 60 nm colloidal silica, 50 wt % POLYPLATE ™ P |
| 28 | 50 wt % 1144 colloidal silica, 50 wt % POLYPLATE ™ P |
| 29 | 60 wt % colloidal alumina, 40 wt % POLYPLATE ™ P |
| 30 | 100 wt % 2327 colloidal silica |
| 31 | 100 wt % 4 nm colloidal silica |
| 32 | 90 wt % 2327 colloidal silica, 10 wt % POLYPLATE ™ P |
| 33 | 80 wt % 2327 colloidal silica, 20 wt % POLYPLATE ™ P |
| 34 | 70 wt % 2327 colloidal silica, 30 wt % POLYPLATE ™ P |
| 35 | 60 wt % 2327 colloidal silica 40 wt % POLYPLATE ™ P |
| 36 | 100 wt % sodium silicate solution |
| 37 | 80 wt % 2327 colloidal silica, 20 wt % 2000C |
| 38 | 70 wt % 2327 colloidal silica, 30 wt % 2000C |
| 39 | 60 wt % 2327 colloidal silica, 40 wt % 2000C |
| 40 | 74.4 wt % sodium silicate, 18.6 wt % POLYPLATE ™ P, 7 wt % water |
| 41 | 12.5 wt % sodium silicate, 50 wt % POLYPLATE ™ P, 37.5 wt % water |
| 42 | 28.6 wt % sodium silicate, 42.8 wt % POLYPLATE ™ P, 28.6 wt % water |
| 43 | 45 wt % 2327 colloidal silica, 50 wt % POLYPLATE ™ P, 5 wt % titanium dioxide |
| 44 | 40 wt % sodium silicate, 30 wt % POLYPLATE ™ P, 30 wt % water |
| 45 | 29.4 wt % sodium silicate, 35.3 wt % POLYPLATE ™ P, 35.3 wt % water |
| 46 | 14.3 wt % sodium silicate, 42.8 wt % POLYPLATE ™ P, 42.8 wt % water |
| 47 | 60 wt % POLYPLATE ™ P, 40 wt % water |
| 48 | 69.5 wt % POLYPLATE ™ P, 30.5 wt % water |
| 49 | 15 wt % 2327 colloidal silica, 55 wt % POLYPLATE ™ P, 30 wt % water |
| 50 | 31 wt % 2327 colloidal silica, 49 wt % POLYPLATE ™ P, 20 wt % water |
| 51 | 7.7 wt % sodium silicate, 46.2 wt % POLYPLATE ™ P, 46.2 wt % water |
| 52 | 10 wt % sodium silicate, 90 wt % water |
| 53 | 25 wt % sodium silicate, 75 wt % water |
| 54 | 50 wt % sodium silicate, 50 wt % water |
| 55 | 90.2 wt % 1144 colloidal silica, 9.8 wt % POLYPLATE ™ P |
| 56 | 50 wt % 2327 colloidal silica, 33 wt % POLYPLATE ™ P, 17 wt % 2000C |
| 57 | 55 wt % 2327 colloidal silica, 30 wt % POLYPLATE ™ P, 15 wt % 2000C |
| 58 | 52.4 wt % 2327 colloidal silica, 31.7 wt % POLYPLATE ™ P, 15.8 wt % 2000C |
| 59 | 7.9 wt % 4 nm colloidal silica, 68.3 wt % POLYPLATE ™ P, 23.7 wt % water |
| 60 | 50 wt % 2327, 50 wt % aluminum hydroxide-2 |
| 61 | 44.5 wt % 1144 colloidal silica, 33.3 wt % glass frit, 22.2 wt % 2000C clay |
| 62 | 53.3 wt % nitric acid treated 1144 colloidal silica*, 46.7 wt % POLYPLATE ™ P<br>* Nitric acid added with stirring to 1144 colloidal silica until pH 2.3 is achieved. |
| 63 | 83.7 wt % 1144 colloidal silica, 16.3 wt % calcium silicate |
| 64 | 50% 1056 colloidal silica, 18% 2000C clay, 32% POLYPLATE ™ P |
| 65 | 50% 1056 colloidal silica, 50% Dixie clay |
| 66 | 50% 1144 colloidal silica, 50% Vansil 50 |

TABLE 2-continued

Slurries

| Slurry | Composition |
|---|---|
| 67 | 53% Cat 80 colloidal silica, 47% POLYPLATE P |
| 68 | 50% cc401 colloidal silica, 45% POLYPLATE P, 5% FM2400 |
| 69 | 50% DP5110 colloidal silica, 45% POLYPLATE P, 5% FM2400 |
| 70 | 50% 1056 colloidal silica, 45% POLYPLATE P, 5% FM2400 |
| 71 | 53% cat 80 colloidal silica 42% Dixie clay, 5% FM2400 |
| 72 | 54% Ludox CL-P colloidal silica, 46% POLYPLATE P |
| 73 | 50% Ludox TMA colloidal silica, 50% POLYPLATE P |
| 74 | 25% 1056 colloidal silica, 25% Cat 80 colloidal silica, 25% Polyplate P, 25% Dixie clay |
| 75 | 25% 1056 colloidal silica, 25% Cat 80 colloidal silica, 25% POLYPLATE P, 25% Dixie clay + 0.33% Z-6040 silane |

Each knitted fiberglass fabric tape was impregnated with a given slurry to produce a given pliable thermal insulating wrap sample, and subsequently dried via a drying/heat treatment procedure as shown in Table 3 below. In each test sample, a given slurry was coated onto ECG heat-set 2" wide knit with a weight of 20 grams (g) and a length of 4 feet.

Each sample was subsequently tested for crush strength as described above. Results are shown in Table 3.

TABLE 3

Test Samples and Results

| Test Sample | Slurry | Coated weight (g) | Dry weight (g) | Condition* | Crush strength N |
|---|---|---|---|---|---|
| 1 | 60 | 74.9 | 58.4 | 90 | 157 |
| 2 | 60 | 60.9 | 48.6 | 500 | 93 |
| 3 | 2 | 82.0 | 57.1 | 90 | 69 |
| 4 | 2 | 89.1 | 61.3 | 500 | 116 |
| 5 | 3 | 110.2 | 79.3 | 90 | 174 |
| 6 | 3 | 112.5 | 80.8 | 500 | 242 |
| 7 | 3 | 108.5 | 78.2 | 500 wet | 119 |
| 8 | 4 | 69.1 | 41.3 | 90 | 29 |
| 9 | 4 | 67.5 | 40.6 | 500 | 41 |
| 10 | 5 | 70.7 | 44 | 90 | 43.6 |
| 11 | 5 | 72.8 | 45 | 500 | 78 |
| 12 | 5 | 68.2 | 42.8 | 500 wet | 58 |
| 13 | 6 | 73.4 | 54.2 | 90 | 85 |
| 14 | 6 | 66.6 | 49.8 | 500 | 52 |
| 15 | 6 | 68.4 | 51 | 500 wet | 75 |
| 16 | 7 | 82.3 | 62.5 | 90 | 174 |
| 17 | 7 | 84.9 | 64.3 | 500 | 266 |
| 18 | 7 | 80.5 | 61.3 | 500 wet | 199 |
| 19 | 8 | 79.4 | 58 | 90 | 60 |
| 20 | 8 | 77.8 | 57 | 500 | 116 |
| 21 | 8 | 83.9 | 60.9 | 500 wet | 83 |
| 22 | 9 | 87.1 | 67 | 90 | 202 |
| 23 | 9 | 82.9 | 64 | 500 | 266 |
| 24 | 9 | 82.9 | 64 | 500 wet | 233 |
| 25 | 10 | 67.6 | 44.1 | 90 | 52 |
| 26 | 10 | 65 | 42.8 | 500 | 100 |
| 27 | 11 | 66.8 | 43.2 | 90 | 25 |
| 28 | 11 | 65.6 | 42.6 | 500 | 38 |
| 29 | 12 | 67.6 | 43.5 | 90 | 42 |
| 30 | 12 | 67.6 | 43.5 | 500 | 43 |
| 31 | 12 | 66.6 | 43 | 500 wet | 40 |
| 32 | 13 | 60.4 | 48.3 | 90 | 46 |
| 33 | 13 | 63.9 | 50.7 | 500 | 63 |
| 34 | 13 | 63.4 | 50.4 | 500 wet | 66 |
| 35 | 14 | 84.1 | 58.4 | 90 | 205 |
| 36 | 14 | 83.2 | 57.9 | 500 | 164 |
| 37 | 14 | 84.7 | 58.8 | 500 wet | 135 |
| 38 | 15 | 74.2 | 46.8 | 90 | 32 |
| 39 | 15 | 74.2 | 46.8 | 500 | 63 |
| 40 | 15 | 71.3 | 45.4 | 500 wet | 46 |
| 41 | 16 | 67.7 | 53.4 | 90 | 98 |
| 42 | 16 | 69.4 | 54.6 | 500 | 209 |
| 43 | 16 | 67.7 | 53.4 | 500 wet | 169 |
| 44 | 17 | 100 | 79.8 | 90 | 270 |
| 45 | 17 | 86.9 | 70 | 500 | 130 |
| 46 | 17 | 78.9 | 64 | 500 wet | 117 |
| 47 | 18 | 96.7 | 77.3 | 90 | 257 |
| 48 | 18 | 93.6 | 75 | 500 | 297 |
| 49 | 18 | 97.3 | 77.8 | 500 wet | 237 |
| 50 | 19 | 128.8 | 101.3 | 90 | 409 |
| 51 | 19 | 110.3 | 87.5 | 500 | 300 |
| 52 | 19 | 121.3 | 95.7 | 500 wet | 335 |
| 53 | 20 | 93.6 | 73.4 | 90 | 307 |
| 54 | 20 | 90.7 | 71.3 | 500 | 417 |
| 55 | 20 | 90.7 | 71.3 | 500 wet | 270 |
| 56 | 21 | 73.1 | 54 | 90 | 149 |
| 57 | 21 | 67.9 | 50.75 | 500 | 229 |
| 58 | 21 | 69.2 | 51.5 | 500 wet | 178 |
| 59 | 22 | 74.7 | 55 | 90 | 187 |
| 60 | 22 | 76.7 | 56.3 | 500 | 216 |
| 61 | 22 | 75.9 | 55.8 | 500 wet | 173 |
| 62 | 55 | 50.5 | 34 | 90 | 41 |
| 63 | 55 | 47.7 | 32.7 | 500 | 44 |
| 64 | 55 | 46.2 | 32 | 500 wet | 37 |
| 65 | 56 | 88 | 67.6 | 90 | 153 |
| 66 | 56 | 70.3 | 55.2 | 500 | 219 |
| 67 | 56 | 75.3 | 58.7 | 500 wet | 213 |
| 68 | 57 | 69.4 | 53.1 | 90 | 110 |
| 69 | 57 | 66.3 | 51 | 500 | 198 |
| 70 | 57 | 69.1 | 52.9 | 500 wet | 165 |
| 71 | 58 | 75.6 | 58.1 | 90 | 124 |
| 72 | 58 | 78.2 | 59.9 | 500 | 271 |
| 73 | 58 | 77.8 | 59.6 | 500 wet | 223 |
| 74 | 59 | 80.2 | 61.8 | 90 | 70 |
| 75 | 59 | 74.7 | 58 | 500 | 153 |
| 76 | 59 | 75 | 58.2 | 500 wet | 129 |
| 77 | 43 | 65.6 | 53.3 | 90 | 93 |
| 78 | 43 | 57.4 | 47.3 | 500 | 140 |
| 79 | 43 | 63.6 | 51.8 | 500 wet | 147 |
| 80 | 49 | 65.2 | 47.6 | 90 | 45 |
| 81 | 49 | 60.8 | 44.9 | 500 | 93 |
| 82 | 50 | 65 | 47.6 | 90 | 64 |
| 83 | 50 | 60.6 | 44.9 | 500 | 125 |
| 84 | 61 | 101.3 | 79.6 | 90 | 295 |
| 85 | 61 | 101.6 | 79.8 | 500 | 340 |
| 86 | 61 | 99.7 | 78.4 | 500 wet | 329 |
| 87 | 63 | 84.1 | 53.9 | 90 | 175 |
| 88 | 63 | 85.1 | 54.9 | 500 | 200 |
| 89 | 63 | 81.4 | 53.6 | 500 wet | 206 |
| 90 | 65 | 83.1 | 61 | 90 | 180 |
| 91 | 65 | 75.4 | 56 | 500 | 391 |

TABLE 3-continued

Test Samples and Results

| Test Sample | Slurry | Coated weight (g) | Dry weight (g) | Condition* | Crush strength N |
|---|---|---|---|---|---|
| 92 | 65 | 75.4 | 56 | 500 wet | 344 |
| 93 | 66 | 88 | 68 | 90 | 425 |
| 94 | 66 | 90 | 69 | 500 | 519 |
| 95 | 66 | 88 | 68 | 500 wet | 424 |

Condition*
"90" means the sample was dried at 90° C. for two hours, cooled to room temperature, and then crushed.
"500" means the sample was dried at 90° C. for two hours, then heated to 500° C. for 18 hours, cooled to room temperature, and then crushed.
"500 wet" means the sample was dried at 90° C. for two hours, then heated to 500° C. for 18 hours, cooled to room temperature, then place in a water bath at room temperature for 18 hours, removed from water, and then crushed.

Example 2

Additional test samples were prepared using the procedures of Example 1. The following test samples utilized various colloidal binders. Results are shown in Table 4.

TABLE 4

Test Samples and Results

| Test Sample | Slurry | Coated weight (g) | Dry weight (g) | Condition | Crush strength N |
|---|---|---|---|---|---|
| 100 | 25 | 74.3 | 58 | 90 | 161 |
| 101 | 25 | 71.6 | 56.1 | 500 | 307 |
| 102 | 25 | 69.4 | 54.6 | 500 wet | 225 |
| 103 | 26 | 65 | 45.9 | 90 | 87 |
| 104 | 26 | 59.5 | 42.7 | 500 | 184 |
| 105 | 26 | 60.3 | 32.2 | 500 wet | 154 |
| 106 | 27 | 65.6 | 54.2 | 90 | 136 |
| 107 | 27 | 60.8 | 50.6 | 500 | 270 |
| 108 | 27 | 61.7 | 51.3 | 500 Wet | 212 |
| 109 | 28 | 75.6 | 58.9 | 90 | 217 |
| 110 | 28 | 74.3 | 58 | 500 | 420 |
| 111 | 28 | 71.6 | 56.1 | 500 wet | 360 |
| 112 | 29 | 83.1 | 52.8 | 90 | 68 |
| 113 | 29 | 71.9 | 47 | 500 | 136 |
| 114 | 29 | 72.5 | 47.3 | 500 wet | 91 |
| 115 | 24 | 71.7 | 50 | 90 | 173 |
| 116 | 24 | 69.1 | 48.5 | 500 | 260 |
| 117 | 24 | 70 | 49 | 500 wet | 247 |
| 118 | 30 | 49 | 31.6 | 90 | 11 |
| 119 | 30 | 49.3 | 31.7 | 500 | 18 |
| 120 | 30 | 53 | 33.2 | 500 wet | 18 |
| 121 | 31 | 53.3 | 30 | 90 | 13.5 |
| 122 | 62 | 87.7 | 66.4 | 90 | 96 |
| 123 | 62 | 80.5 | 61.8 | 500 | 187 |
| 124 | 62 | 80.8 | 62.3 | 500 wet | 141 |
| 125 | 64 | 78.5 | 58 | 90 | 211 |
| 126 | 64 | 70.8 | 53 | 500 | 378 |
| 127 | 64 | 67.7 | 51 | 500 wet | 331 |
| 128 | 67 | 78 | 60 | 90 | 198 |
| 129 | 67 | 72 | 56 | 500 | 468 |
| 130 | 67 | 73 | 57 | 500 wet | 428 |
| 131 | 68 | 73 | 56 | 90 | 122 |
| 132 | 68 | 67 | 52 | 500 | 227 |
| 133 | 68 | 68 | 53 | 500 wet | 177 |
| 134 | 69 | 75 | 56 | 90 | 112 |
| 135 | 69 | 65 | 49 | 500 | 211 |
| 136 | 69 | 66 | 50 | 500 wet | 137 |
| 137 | 70 | 72 | 54 | 90 | 253 |
| 138 | 70 | 69 | 53 | 500 | 361 |
| 139 | 70 | 71 | 53 | 500 wet | 370 |
| 140 | 71 | 76 | 59 | 90 | 265 |
| 141 | 71 | 71 | 55 | 500 | 495 |
| 142 | 71 | 68 | 53 | 500 wet | 410 |
| 143 | 72 | 81 | 61 | 90 | 161 |
| 144 | 72 | 75 | 57 | 500 | 450 |
| 145 | 72 | 73 | 56 | 500 wet | 377 |
| 146 | 73 | 71 | 54 | 90 | 91 |

TABLE 4-continued

Test Samples and Results

| Test Sample | Slurry | Coated weight (g) | Dry weight (g) | Condition | Crush strength N |
|---|---|---|---|---|---|
| 147 | 73 | 72 | 55 | 500 | 202 |
| 148 | 73 | 64 | 49 | 500 wet | 163 |
| 149 | 74 | 73 | 56 | 90 | 195 |
| 150 | 74 | 69 | 53 | 500 | 502 |
| 151 | 74 | 68 | 52 | 500 wet | 378 |
| 152 | 75 | 69 | 54 | 500 | 489 |
| 153 | 75 | 66 | 51 | 500 | 460 |

Example 3

Additional test samples were prepared using the procedures of Example 1. The following test samples utilized sodium silicate binders. Results are shown in Table 5.

TABLE 5

Test Samples and Results

| Test Sample | Slurry | Coated weight (g) | Dry weight (g) | Condition | Crush strength N |
|---|---|---|---|---|---|
| 200 | 36 | 80.2 | 43.6 | 90 | 208 |
| 201 | 40 | 93.9 | 55.3 | 90 | 313 |
| 202 | 41 | 81.9 | 54 | 90 | 202 |
| 203 | 41 | 83.7 | 54 | 500 | 242 |
| 204 | 41 | 85.6 | 56 | 500 wet | 240 |
| 205 | 42 | 70.36 | 47.2 | 90 | 383 |
| 206 | 42 | 69.8 | 46.9 | 500 | 131 |
| 207 | 42 | 67.77 | 45.8 | 500wet | 150 |
| 208 | 44 | 54.8 | 35.9 | 90 | 257 |
| 209 | 44 | 61.4 | 38.9 | 500 | 90 |
| 210 | 44 | 63.1 | 39.7 | 500 wet | 80 |
| 211 | 45 | 66.3 | 41.7 | 90 | 275 |
| 212 | 45 | 59.9 | 38.7 | 500 | 132 |
| 213 | 45 | 60.4 | 38.9 | 500 wet | 94 |
| 214 | 46 | 68.1 | 43.9 | 90 | 145 |
| 215 | 46 | 60.3 | 39.5 | 500 | 175 |
| 216 | 46 | 59.7 | 39.2 | 500 wet | 153 |
| 217 | 51 | 71.8 | 45.5 | 90 | 83 |
| 218 | 51 | 59.6 | 39.5 | 500 | 129 |
| 219 | 52 | 45.5 | 21 | 90 | 3 |
| 220 | 52 | 45.5 | 21 | 500 | 2 |
| 221 | 52 | 45.5 | 21 | 500 wet | 2 |
| 222 | 53 | 47.6 | 22.7 | 90 | 13 |
| 223 | 53 | 44.5 | 22.4 | 500 | 12 |
| 224 | 53 | 45.51 | 22.5 | 500 wet | 7 |
| 225 | 54 | 48.6 | 25.6 | 90 | 26 |
| 226 | 54 | 47 | 25.3 | 500 | 26 |
| 227 | 54 | 46.5 | 25.2 | 500 wet | 26 |

Example 6

Additional test samples were prepared using the procedures of Example 1. The following test samples show crush strength as filler weight percent varies in a given test sample. Results are shown in Table 6.

TABLE 6

Test Samples and Results

| Test Sample | Slurry | Coated weight (g) | Dry weight (g) | Condition | Crush strength N |
|---|---|---|---|---|---|
| 300 | 32 | 58.5 | 37.7 | 90 | 37 |
| 301 | 33 | 55 | 38.2 | 90 | 46 |
| 302 | 34 | 66 | 46.7 | 90 | 99 |
| 303 | 35 | 79.5 | 58.1 | 90 | 166 |
| 304 | 1 | 69.6 | 54.7 | 90 | 193 |
| 305 | 37 | 67.3 | 44.6 | 90 | 105 |
| 306 | 38 | 71.4 | 49.8 | 90 | 109 |
| 307 | 39 | 94.5 | 67.7 | 90 | 229 |

Example 7

Additional test samples were prepared using the procedures of Example 1. The following test samples show crush strength as slurry coating weight varies in a given test sample. Results are shown in Table 7.

TABLE 7

Test Samples and Results

| Test Sample | Slurry | Coated weight (g) | Dry weight (g) | Condition* | Crush strength N |
|---|---|---|---|---|---|
| 400 | 1 | 45.4 | 37.8 | 150 | 44 |
| 401 | 1 | 47.7 | 39.4 | 150 | 60 |
| 402 | 1 | 53.8 | 43.6 | 150 | 77 |
| 403 | 1 | 57.2 | 46 | 150 | 91 |
| 404 | 1 | 60.1 | 48 | 150 | 101 |
| 405 | 1 | 65.2 | 51.7 | 150 | 120 |
| 406 | 1 | 69.1 | 54.4 | 150 | 125 |
| 407 | 1 | 72 | 56.4 | 150 | 138 |
| 408 | 1 | 76.8 | 59.8 | 150 | 158 |
| 409 | 28 | 84.4 | 65.1 | 150 | 180 |

Condition*
"150" means the sample was dried at 90° C. for 2 hours, then heated at 150° C. for 2 hours, cooled to room temperature, and tested.

Example 8

Additional test samples were prepared using the procedures of Example 1 except various fabrics and fabric weights were utilized as shown in Table 8 below. Results are shown in Table 8.

TABLE 8

Test Samples and Results

| Test Sample | Slurry | Fabric | Fabric weight (g) | Coated weight (g) | Dry weight (g) | Condition | Crush Strength (N) |
|---|---|---|---|---|---|---|---|
| 500 | 21 | 4" ECG | 37.9 | 144.8 | 106.3 | 90 | 302 |
| 501 | 21 | 4" ECDE | 39.4 | 153 | 112.1 | 90 | 338 |
| 502 | 21 | 3" ECG | 30.0 | 113.8 | 83.6 | 90 | 219 |
| 503 | 21 | 3" ECG no HT | 33.1 | 110.3 | 82.53 | 90 | 270 |
| 504 | 21 | Silica | 71.0 | 222.1 | 167.7 | 90 | 575 |
| 505 | 21 | E-glass weave | 67.8 | 267 | 195.3 | 90 | 1628 |

Example 9

Additional test samples were prepared using the procedures of Example 1 except colloidal oxides or sodium silicates were not utilized. Results are shown in Table 9.

TABLE 9

Test Samples and Results

| Test Sample | Slurry | Coated weight (g) | Dry weight (g) | Condition | Crush strength N |
|---|---|---|---|---|---|
| 600 | 47 | 57.8 | 42.7 | 90 | 34 |
| 601 | 48 | 85.3 | 65.4 | 90 | 52 |
| 602 | 48 | 79.1 | 61.1 | 500 | 154 |
| 603 | 48 | 78.6 | 60.7 | 500 wet | 110 |
| 604 | 61 | 65.3 | 38.2 | 90 | 77 |
| 605 | 61 | 60.1 | 37.6 | 500 | 195 |
| 606 | 61 | 62.5 | 38 | 500 wet | 170 |

Samples 604, 605, and 606 utilize in situ formations of silicate via dissolution of clay by sodium hydroxide to form silicates.

Additional Embodiments

System Component Embodiments

1. These embodiments are directed to a component of a system, where (a) a portion or all of the component exhibits or produces an external elevated temperature and the system needs to be thermally insulated to prevent or reduce the loss or transfer of heat from the component into the surrounding environment, (b) a portion or all of the component or something within the component is susceptible to being damaged by exposure to elevated temperatures, or (c) both (a) and (b). The elevated temperature can be at least about 200° C., 210° C., 220° C., 230° C., 240° C., 250° C., 260° C., 270° C., 280° C., 290° C., or 300° C. The elevated temperature may be as high as up to and including about 1050° C., 1100° C., 1150° C., 1200° C., 1250° C., 1300° C., 1350° C., 1400° C., 1450° C., 1500° C., 1550° C., or 1600° C. The component comprises a system component structure and a thermal insulating wrap. The thermal insulating wrap comprises:
  at least one mixture (e.g., an aqueous mixture) comprising an inorganic binder, inorganic filler particles, and water and/or other suitable solvent(s);
  a fabric comprising inorganic fibers, the fabric being impregnated with the mixture so as to form a pliable binder wrap,
  wherein the pliable binder wrap is wound two or more (multiple) times around, at least once (i.e., at least one complete revolution) around, or almost completely (i.e., more than 180°, 190°, 200°, 210°, 220°, 230°, 240°, 250°, 260°, 270°, 280°, 290°, or 300° and less than 360° around at least a portion of the system component structure. The filler particles allow for a very high solids content of the binder/filler mixture to remain in the fabric after the water and/or other solvent(s) evaporate or are otherwise removed.

Examples of such a system that exhibits or produces such an elevated temperature include an exhaust system for an internal combustion engine, as well as industrial applications such as insulating steam lines or other high temperature lines. Examples of such systems susceptible to being damaged by exposure to elevated temperatures (e.g., such as caused by a fire or other high temperature environments) include commercial or industrial systems, like those found in buildings, and residential systems, like those found in homes. Such systems may include, e.g., fittings, fuel lines, electric lines, hydraulic lines, pneumatic lines, etc. that can be found in buildings and that need to be protected from excessive heat such as, for example, from a fire. For an exhaust system, the component structure can be an exhaust system structure (e.g., an exhaust pipe, pollution control device, muffler, expansion chamber, resonator etc.) having an interior through which exhaust gases flow, and the thermal insulating wrap is intended to thermally insulate so as to keep heat within at least a portion, most or all of the exhaust system structure. For an electrical system, the component structure could be, for example, an electrical conduit, pipe or circuit box through which electrical wires are run, and the thermal insulating wrap is intended to thermally insulate so as to keep heat out of at least a portion, most or all of the electrical system component structure.

2. The component according to embodiment 1, wherein the system component structure is an exhaust system component structure in the form of a section or portion of exhaust pipe, a pollution control device (e.g., a section or portion of a diesel particulate filter or trap, a catalytic converter, etc.), a muffler, an expansion chamber or a resonator.

3. The component according to embodiment 1 or 2, wherein the system component structure comprises a pipe or housing. When the system needs to be thermally insulated to prevent or reduce the loss or transfer of heat into the surrounding environment, the component structure will likely be made of a suitable metal material (e.g., an elemental metal or metal alloy). When the system needs to be protected from excessive heat, the component structure may be made of a suitable metal or polymeric material.

4. The component according to any one of embodiments 1 to 3, wherein the pliable binder wrap is wound at least once around the system component structure.

5. The component according to any one of embodiments 1 to 4, wherein the mixture is a slurry comprising water, the inorganic binder and the inorganic filler particles.

6. The component according to any one of embodiments 1 to 5, wherein the inorganic binder comprises inorganic binder particles having a maximum size of about 200 nm.

7. The component according to any one of embodiments 1 to 6, wherein the inorganic binder comprises a mixture of water and inorganic binder particles.

8. The component according to embodiment 7, wherein the inorganic binder is a solution of inorganic colloidal particles.

9. The component according to any one of embodiments 1 to 8, wherein the inorganic binder comprises colloidal silica particles, alumina particles or a combination thereof.

10. The component according to any one of embodiments 1 to 9, wherein the inorganic binder comprises inorganic binder particles that are dissolved in the water.

11. The component according to any one of embodiments 1 to 10, wherein the inorganic binder comprises dissolved sodium silicate, potassium silicate, lithium silicate, or a combination thereof.

12. The component according to any one of embodiments 1 to 11, wherein the inorganic filler particles comprise any particulate, when mixed with the inorganic binder in the presence of water, that causes a substantial portion of the inorganic binder to be retained in the fabric without forming a gel or otherwise coagulating such that the pliable binder wrap becomes a solid mass, before the pliable binder wrap can be wound around the system component structure (e.g., the exterior of an exhaust system component structure).

13. The component according to any one of embodiments 1 to 11, wherein the inorganic binder comprises colloidal particles and the inorganic filler particles comprise any particulate that retains a substantial portion of the inorganic binder in the fabric while not forming a gel or otherwise coagulating when mixed with the inorganic binder in the presence of water.

14. The component according to embodiment 12 or 13, wherein the inorganic filler particles retain most of the inorganic binder in the fabric.

15. The component according to any one of embodiments 1 to 14, wherein the inorganic filler particles have a maximum size of up to about 100 microns. It can be desirable for the inorganic filler particles to have a minimum size of about 0.05 microns.

16. The component according to any one of embodiments 1 to 15, wherein the inorganic filler particles comprise particles of a clay.

17. The component according to any one of embodiments 1 to 16, wherein the inorganic filler particles comprise particles of a calcined clay, delaminated clay, water washed clay, surface treated clay, or any combination thereof.

18. The component according to any one of embodiments 1 to 17, wherein the inorganic filler particles comprise particles of a kaolin clay, bentonite clay, montmorillonite clay, or any combination thereof.

19. The component according to any one of embodiments 1 to 18, wherein the inorganic filler particles comprise particles of elemental metal, metal alloy, precipitated silica, fume silica, ground silica, fumed alumina, alumina powder, talc, calcium carbonate, aluminum hydroxide, titanium dioxide, glass bubbles, silicon carbide, calcium silicate, glass frit, or any combination thereof.

20. The component according to any one of embodiments 1 to 19, wherein the inorganic fibers of the fabric are suitable for being woven, knitted or both woven and knitted into the fabric, 21. The component according to any one of embodiments 1 to 20, wherein the inorganic fibers of the fabric comprise glass fibers, silica fibers, basalt fibers, ceramic polycrystalline fibers, heat treated refractory ceramic fibers, carbon fibers, graphite fibers, or any combination thereof.

22. The component according to any one of embodiments 1 to 21, wherein the fabric is impregnated throughout all of its thickness with the mixture so as to form the pliable binder wrap.

23. The component according to any one of embodiments 1 to 22, wherein the fabric is a woven fabric, knitted fabric or a combination of both types of fabric.

24. The component according to any one of embodiments 1 to 23, wherein the inorganic fibers of the fabric comprise different types of inorganic fibers.

25. The component according to any one of embodiments 1 to 24, wherein the fabric is in the form of a sheet or a strip.

26. The component according to any one of embodiments 1 to 25, wherein the fabric is in the form of a sheet and only one layer of the sheet is needed to cover the portion of the system component structure (e.g., the exterior of an exhaust system component structure) to be thermally insulated.

27. The component according to any one of embodiments 1 to 25, wherein the fabric is in the form of a strip that must be wound multiple times around the system component structure (e.g., the exterior of an exhaust system component structure) in order to cover the portion of the system component structure to be thermally insulated.

28. The component according to any one of embodiments 1 to 27, further comprising at least one or any combination of one or more thermal insulators comprising inorganic fibers, one or more metallic plates or foils, and one or more layers of a ceramic material, wherein any such thermal insulator, metallic plate or foil, and ceramic layer used is disposed between the pliable binder wrap and the system component structure (e.g., the exterior surface of an exhaust system component structure). In addition, each of the metallic (i.e., elemental metal, metal alloy, or metal composite) plates or foils, and layers of ceramic material, may be laminated within the thermal insulating wrap, e.g., between layers of the pliable binder wrap, between the pliable binder wrap and the system component structure, between the pliable binder wrap and a thermal insulator, or any combination thereof. Such a metallic plate or foil, and ceramic material layer, may function, for example, as a water proofing or water resistance barrier, as a reflective heat shield, to increase the opacity of the thermal insulating wrap, or any combination of such functions. It may be desirable to make such a metallic plate or foil out of a high temperature resistant metallic material such as, for example, nickel alloys like Inconel and stainless steel. The ceramic material of the layer may be a tile, or any other such ceramic structure.

29. The component according to any one of embodiments 1 to 28, wherein the at least one thermal insulator is dimensioned so as to insulate at least a portion of an exterior surface of the system component structure.

30. The component according to any one of embodiments 1 to 28, wherein the at least one thermal insulator is dimensioned so as to insulate all of an exterior surface of the system component structure.

31. The component according to any one of embodiments 1 to 30, wherein the at least one thermal insulator is a plurality of separate thermal insulators that are between the pliable binder wrap and the system component structure.

32. The component according to embodiment 31, wherein the thermal insulators are spaced apart and separated from one another.

33. The component according to any one of embodiments 1 to 32, wherein each thermal insulator comprises multiple layers of inorganic fibers.

34. The component according to any one of embodiments 1 to 33, wherein each thermal insulator is in the form of a nonwoven fibrous web, mat, scrim or strip.

35. The component according to any one of embodiments 1 to 34, wherein each thermal insulator comprises glass fibers, silica fibers, basalt fibers, refractory ceramic fibers, heat treated refractory ceramic fibers, polycrystalline fibers, high temperature biosoluble inorganic fibers, carbon fibers, graphite fibers, aerogel insulation, or any combination thereof.

36. The component according to any one of embodiments 1 to 35, wherein the pliable binder wrap is wound completely around all of the system component structure.

37. The component according to any one of embodiments 1 to 36, wherein at least 2 layers of the pliable binder wrap are wound one complete revolution around the system component structure (e.g., the exterior of the exhaust system structure).

38. The component according to any one of embodiments 1 to 37, wherein the thermal insulating wrap is wound so that at least a portion of the pliable binder wrap and the thermal insulator directly contacts an exterior surface of the system component structure.

39. The component according to any one of embodiments 1 to 38, wherein the pliable binder wrap comprises two or more pieces.

40. The component according to any one of embodiments 1 to 39, wherein the pliable binder wrap is in a dried state and transformed into a rigid binder wrap. It is acceptable for the rigid binder wrap to 41. The component according to embodiment 40, wherein the rigid binder wrap exhibits a minimum crush strength of at least about 40 N (or at least 20 N) per linear inch.

It is desired that the rigid binder wrap be at most crushable, while the overall integrity of the rigid binder wrap is preserved. As used herein, the overall integrity of the rigid binder wrap is considered to be preserved as long as the underlying thermal insulator (when present), or the underlying exterior surface of the system component structure (i.e., the underlying surface not covered by a thermal insulator) would not be substantially exposed such that the rigid binder wrap could no longer perform its intended purpose (e.g., protecting the underlying structure, providing the desired degree of insulation, etc.). The purpose of the rigid binder wrap can include at least one or any combination of providing a degree of thermal insulation, as well as protecting the thermal insulator, the system component structure, or both from being damaged (e.g., by any one or any combination of road debris impacts, wind, vibrational forces, inclement weather, etc.). Thus, it can be acceptable for the rigid binder wrap to be in some degree of a crushed state. It is desirable, however, for the rigid binder wrap not to shatter into pieces that fall off of the system component structure and are large enough to prevent the rigid binder wrap from performing its intended purpose.

42. The component according to embodiment 41, wherein at the minimum crush strength, there is not enough breakage of the inorganic fibers to cause enough of the rigid binder wrap to break off so as to expose the underlying thermal insulator.

43. The component according to any one of embodiments 40 to 42, wherein the system component structure is an exhaust system component structure, and the thermal insulating wrap does not delaminate for at least 1 year or 12,000 miles, 3 years or 36,000 miles, 5 years or 60,000 miles, or 10 years or 100,000 miles of normal operation of the component in an exhaust system of an internal combustion engine.

44. The component according to any one of embodiments 40 to 43, wherein the pliable binder wrap comprises in the range of from about 1% to about 40% inorganic binder particles, from about 5% to about 75% inorganic filler particles, and from about 25% to about 65% of the inorganic fibers of the fabric, with each percentage being on a dry weight basis. It can be desirable for the pliable binder wrap to comprise in the range of from about 14% to about 67% inorganic filler particles, on a dry weight basis. In addition or alternatively, it can be desirable for the pliable binder wrap to comprise in the range of from about 19% to about 55% of the inorganic fibers of the fabric, on a dry weight basis.

45. The component according to any one of embodiments 1 to 44, wherein the system component structure has an exterior surface and a structural feature (e.g., a port, bracket, etc.) extending off or out from the exterior surface, and the thermal insulating wrap further comprises a fibrous sheet- or mat-like structure having an opening (e.g., a slit or hole) formed therethrough and being impregnated with a mixture so as to form a pliable binder mat, with the mixture comprising an inorganic binder, inorganic filler particles, and water and/or other suitable solvent(s). The structural feature of the system component structure is disposed through the opening of the pliable binder mat. The fibrous sheet- or mat-like structure can be a piece of fabric like that used to make a pliable binder wrap or a piece of a nonwoven fibrous web, mat, scrim or strip like that used to make a thermal insulator.

46. The component according to embodiment 45, wherein at least a portion of the pliable binder mat is exposed and not covered by the pliable binder wrap. Almost all (i.e., at least 75%), most (i.e., more than 50%) or at least a portion of the pliable binder mat is disposed between the exterior surface of the system component structure and the pliable binder wrap. It is desirable for at least enough of the pliable binder mat to be so disposed that it will be secure in place by the pliable binder wrap.

Thermal Insulating Wrap Embodiments

47. A thermal insulating wrap as used in the component (e.g., the component of an exhaust system for an internal combustion engine) according to any one of embodiments 1 to 46.

48. A thermal insulating wrap for thermally insulating at least a portion of an exterior of a system component structure (e.g., an exhaust system component structure), with the thermal insulating wrap comprising:
 a mixture comprising an inorganic binder, inorganic filler particles, and water and/or other suitable solvent(s); and
 a fabric comprising inorganic fibers, the fabric being impregnated with the mixture so as to form a pliable binder wrap,
 wherein the pliable binder wrap is dimensioned to be wound two or more (multiple) times around, at least once (i.e., at least one complete revolution) around, or almost completely (i.e., more than 180°, 190°, 200°, 210°, 220°, 230°, 240°, 250°, 260°, 270°, 280°, 290°, or 300° and less than 360° around at least a portion of the system component structure.

49. The thermal insulating wrap according to embodiment 48, further comprising:
 at least one thermal insulator comprising inorganic fibers, wherein the at least one thermal insulator is disposed such that, when the thermal insulating wrap is applied, the at least one thermal insulator is disposed between the pliable binder wrap and a system component structure (e.g., the exterior of an exhaust system component structure).

Kit Embodiment

50. A kit comprising the thermal insulating wrap according to embodiment 48 or 49, wherein the pliable binder wrap is wound into the form of a roll and disposed into a moisture barrier container.

Method of Making Thermal Insulating Wrap Embodiments

51. A method of making a thermal insulating wrap as used in the component of a system (e.g., an exhaust system for an internal combustion engine), the method comprising:
 forming a mixture comprising mixing water and/or other suitable solvent(s), inorganic binder particles and inorganic filler particles;
 providing a fabric comprising inorganic fibers that can be wound two or more (multiple) times around, at least once (i.e., at least one complete revolution) around, or almost completely (i.e., more than 180°, 190°, 200°, 210°, 220°, 230°, 240°, 250°, 260°, 270°, 280°, 290°, or 300° and less than 360° around at least a portion of a system component structure (e.g., an exhaust system component structure); and
 impregnating the fabric with the mixture so as to form a pliable binder wrap,
 wherein the fabric can be impregnated with the mixture before or after being wound around the system component structure.

52. The method according to embodiment 51, further comprising:
 disposing at least one thermal insulator comprising inorganic fibers such that, when the pliable binder wrap is wound around at least a portion of a system component structure, the at least one thermal insulator is disposed between the pliable binder wrap and the system component structure.

System Embodiment

53. A system (e.g., an exhaust system of an internal combustion engine) comprising a component according to any one of embodiments 1 to 46.

Internal Combustion Engine Embodiment

54. An internal combustion engine in combination with an exhaust system according to embodiment 53.

Method of Thermally Insulating Embodiments

55. A method of thermally insulating a component of a system (e.g., an exhaust system for an internal combustion engine), with the component comprising a system component structure (e.g., an exhaust system component structure having an interior through which exhaust gases flow and an exterior). The method comprises:
 providing a thermal insulating wrap suitable (e.g., dimensioned and/or designed) for thermally insulating at least a portion of the system component structure (e.g., the exterior of the exhaust system component structure), with the thermal insulating wrap comprising:
 a mixture comprising an inorganic binder, inorganic filler particles, and water and/or other suitable solvent(s), and
 a fabric comprising inorganic fibers, with the fabric being impregnated with the mixture so as to form a pliable binder wrap;
 wrapping the pliable binder wrap so as to be wound two or more (multiple) times around, at least once (i.e., at least one complete revolution) around, or almost completely (i.e., more than 180°, 190°, 200°, 210°, 220°, 230°, 240°, 250°, 260°, 270°, 280°, 290°, or 300° and less than 360°) around at least a portion of the system component structure; and drying the pliable binder wrap so as to be transformed into a rigid binder wrap wound around at least the portion of the system component structure.

56. The method according to embodiment 55, wherein the thermal insulating wrap provided further comprises at least one thermal insulator comprising inorganic fibers, and the at least one thermal insulator is disposed between the pliable binder wrap and the system component structure (e.g., the exterior of the exhaust system component structure) during the wrapping.

This invention may take on various modifications, alterations and uses without departing from its spirit and scope. For example, the present invention may be useful in repairing a system component structure or in covering and/or protecting a previously repaired portion of a system component structure. In particular, for example, the present inventive wrap may be useful in closing a hole or otherwise repairing a pipe or housing such as, e.g., an exhaust pipe or the housing of a pollution control device (e.g., a diesel particulate filter or trap, a catalytic converter, etc.), muffler, expansion chamber, resonator, or other system component structure. The present inventive wrap may also be useful in securing, e.g., a plate or foil (e.g., made of metal or ceramic) or other repair structure so as to close over or otherwise repair such a hole or defect in a system component structure (e.g., an exhaust system component structure). Accordingly, this invention is not limited to the above-described but is to be controlled by the limitations set forth in the following claims and any equivalents thereof.

This invention may be suitably practiced in the absence of any element not specifically disclosed herein.

All patents and patent applications cited above, including those in the Background section, are incorporated by reference into this document in total.

What is claimed is:

1. A component of an electrical system, where (a) a portion or all of the component exhibits or produces an external elevated temperature and the system needs to be thermally insulated to prevent or reduce the loss or transfer of heat from the component into the surrounding environment, (b) a portion or all of the component or something within the component is susceptible to being damaged by exposure to elevated temperatures, or (c) both (a) and (b), said component comprising an electrical system component structure; and a thermal insulating structure for thermally insulating at least a portion of said electrical system component structure, with said thermal insulating structure comprising:

a mixture comprising an inorganic binder, inorganic filler particles, and water; and a woven fabric comprising inorganic fibers in the form of a sheet- or mat-like structure, said woven fabric being impregnated with said mixture so as to form a pliable binder structure, wherein said pliable binder structure is positioned on at least a portion of said electrical system component structure such that said pliable binder structure forms an exposed surface of said electrical system component structure.

2. The component according to claim 1, wherein said inorganic filler particles comprise any particulate, when mixed with said inorganic binder in the presence of water, that causes a substantial portion of said inorganic binder to be retained in said woven fabric without forming a gel or otherwise coagulating such that said pliable binder structure becomes a solid mass before said pliable binder structure can be positioned on said electrical system component structure.

3. The component according to claim 1, wherein said inorganic binder comprises colloidal particles and said inorganic filler particles comprise any particulate that retains a substantial portion of said inorganic binder in said woven fabric while not forming a gel or otherwise coagulating when mixed with said inorganic binder in the presence of water.

4. The component according to claim 1, wherein said inorganic filler particles have a maximum size of up to about 100 microns.

5. The component according to claim 1, wherein said woven fabric is in the form of a sheet and only one layer of said sheet is needed to cover the portion of said electrical system component structure to be thermally insulated.

6. The component according to claim 1, further comprising at least one or both of a thermal insulator comprising inorganic fibers and a metallic plate, wherein each of said thermal insulator and said metallic plate is disposed adjacent to the thermal insulating structure.

7. The component according to claim 6, wherein said at least one thermal insulator is a plurality of separate thermal insulators that are between said pliable binder structure and said electrical system component structure.

8. The component according to claim 1, wherein at least 2 layers of the pliable binder structure are positioned on the electrical system component structure.

9. The component according to claim 1, wherein said pliable binder structure is in a dried state and transformed into a rigid binder structure.

10. The component according to claim 9, wherein said rigid binder structure exhibits a minimum crush strength of at least about 40 N, with said rigid binder structure being at most crushed while the overall integrity of said rigid binder structure is preserved.

11. The component according to claim 9, wherein said pliable binder structure comprises in the range of from about 1% to about 35% inorganic binder particles, from about 5% to about 75% inorganic filler particles, and from about 25% to about 65% of the inorganic fibers of said woven fabric, with each percentage being on a dry weight basis.

12. A thermal insulating structure for thermally insulating at least a portion of an electrical system component structure, with said thermal insulating structure comprising:

a mixture comprising an inorganic binder, inorganic filler particles, and water; and a woven fabric comprising inorganic fibers in the form of a sheet- or mat-like structure, said woven fabric being impregnated with said mixture so as to form a pliable binder structure, wherein said pliable binder structure is dimensioned to be wound almost completely or at least once around at least a portion of the electrical system component structure, and said inorganic filler particles comprise any particulate, when mixed with said inorganic binder in the presence of water, that causes a substantial portion of said inorganic binder to be retained in said woven fabric without forming a gel or otherwise coagulating such that said pliable binder structure becomes a solid mass before said pliable binder structure can be wound almost completely or at least once around said electrical system component structure.

13. The thermal insulating structure of claim 12, wherein the mixture is an aqueous mixture and wherein the aqueous mixture comprises at least about 20% water by weight.

14. The thermal insulating structure of claim 13, wherein the mixture comprises at least about 20% inorganic filler particles by weight.

15. The thermal insulating structure of claim 12, wherein the inorganic binder particles have a maximum particle size of about 200 nm.

16. A thermal insulating structure for thermally insulating at least a portion of an electrical system component structure, with said thermal insulating structure comprising:
 a mixture comprising an inorganic binder, inorganic filler particles, and water;
 a woven fabric comprising inorganic fibers in the form of a sheet- or mat-like structure, said woven fabric being impregnated with said mixture so as to form a pliable binder structure; and
 at least one thermal insulator comprising inorganic fibers, wherein said pliable binder structure is dimensioned to cover almost completely or all of the electrical system component structure, and wherein said at least one thermal insulator is disposed such that, when said thermal insulating structure is applied, said at least one thermal insulator is disposed between said pliable binder structure and the electrical system component structure.

17. The thermal insulating structure of claim 16, wherein the pliable binder structure is impregnated substantially throughout a thickness of the pliable binder structure.

18. The component of claim 1, wherein an adhesive layer is disposed so as to enhance the bond between said electrical system component structure and said thermal insulating structure.

19. The component of claim 1, wherein for (a) a portion or all of the component exhibits or produces an external elevated temperature of at least about 200° C. and the system needs to be thermally insulated to prevent or reduce the loss or transfer of heat from the component into the surrounding environment, and for (b) a portion or all of the component or something within the component is susceptible to being damaged by exposure to elevated temperatures of at least about 200° C.

20. The component of claim 1, wherein for (a), a portion or all of the component exhibits or produces an external temperature in the range of from at least about 300° C. up to 1600° C. and the system needs to be thermally insulated to prevent or reduce the loss or transfer of heat from the component into the surrounding environment, and for (b), a portion or all of the component or something within the component is susceptible to being damaged by exposure to elevated temperatures in the range of from at least about 300° C. up to about 1600° C.

* * * * *